(12) United States Patent
Neuburger et al.

(10) Patent No.: US 7,765,044 B2
(45) Date of Patent: Jul. 27, 2010

(54) DRAG REDUCING SYSTEM

(76) Inventors: Doron Neuburger, 9202 Wedd Dr., Overland Park, KS (US) 66212; Liat Lazer, 9202 Wedd Dr., Overland Park, KS (US) 66212

( * ) Notice: Subject to any disclaimer, the term of this patent is extended or adjusted under 35 U.S.C. 154(b) by 40 days.

(21) Appl. No.: 11/485,703

(22) Filed: Jul. 13, 2006

(65) Prior Publication Data

US 2007/0013209 A1    Jan. 18, 2007

Related U.S. Application Data

(60) Provisional application No. 60/699,219, filed on Jul. 14, 2005.

(51) Int. Cl.
| G06F 7/00 | (2006.01) |
| B60P 3/34 | (2006.01) |
| B62C 1/06 | (2006.01) |
| B62D 33/08 | (2006.01) |
| G08G 1/09 | (2006.01) |
| B60H 1/00 | (2006.01) |
| B60H 1/26 | (2006.01) |

(52) U.S. Cl. .................. 701/36; 296/26.04; 296/180.1; 296/210; 340/905; 454/136

(58) Field of Classification Search ............... 296/107.1
See application file for complete search history.

(56) References Cited

U.S. PATENT DOCUMENTS

| 259,874 A | 6/1961 | Ferrero |
| 3,971,586 A | 7/1976 | Saunders |
| 4,006,932 A | 2/1977 | McDonald |
| 4,018,472 A | 4/1977 | Mason, Jr. |
| 4,035,013 A | 7/1977 | Abbott, III |
| 4,047,747 A | 9/1977 | Beers |
| 4,142,755 A | 3/1979 | Keedy |
| 4,236,745 A | 12/1980 | Davis |
| 4,245,862 A | 1/1981 | Buckley, Jr. |
| 4,257,641 A | 3/1981 | Keedy |
| 4,320,920 A | 3/1982 | Goudey |
| 4,509,786 A | 4/1985 | Gregg |

(Continued)

FOREIGN PATENT DOCUMENTS

CA    2 470 291    12/2005

(Continued)

OTHER PUBLICATIONS

Fred Browand, Viterbi School of Engineering, University of Southern California, Reducing Aerodynamic Drag and Fuel Consumption, prepared for Advanced Transportation Workshop, Oct. 10-11, 2005, 27 pages.

(Continued)

*Primary Examiner*—Khoi Tran
*Assistant Examiner*—Nicholas Kiswanto
(74) *Attorney, Agent, or Firm*—Jerome R. Smith, Jr.; Elman Technology Law, P.C.

(57) ABSTRACT

Systems and methods for reducing drag in vehicles, typically trucks, such as tractor-trailers, have moveable moving drag reducing apparatus. This movable drag reducing apparatus is for movement into and out of various positions, in accordance with the location of the vehicle with respect to its distance from an obstacle.

43 Claims, 34 Drawing Sheets

U.S. PATENT DOCUMENTS

| | | | |
|---|---|---|---|
| 4,702,509 | A | 10/1987 | Elliott, Sr. |
| 4,741,569 | A | 5/1988 | Sutphen |
| 4,818,015 | A | 4/1989 | Scanlon |
| 4,978,162 | A | 12/1990 | Labbe |
| 5,171,057 | A | 12/1992 | Sharp |
| 5,236,347 | A | 8/1993 | Andrus |
| 6,079,769 | A | 6/2000 | Fannin et al. |
| 6,257,654 | B1 | 7/2001 | Boivin et al. |
| 6,286,894 | B1 | 9/2001 | Kingham |
| 6,666,498 | B1 | 12/2003 | Whitten |
| 6,779,834 | B1 * | 8/2004 | Keller ............ 296/180.4 |
| 6,986,544 | B2 | 1/2006 | Wood |
| 7,008,005 | B1 | 3/2006 | Graham |
| 2002/0005655 | A1 | 1/2002 | Bauer et al. |
| 2002/0021023 | A1 | 2/2002 | Leban |
| 2003/0205913 | A1 | 11/2003 | Leonard |
| 2003/0227194 | A1 | 12/2003 | Farlow et al. |
| 2004/0119319 | A1 | 6/2004 | Reiman et al. |
| 2005/0121240 | A1 | 6/2005 | Aase et al. |
| 2006/0049665 | A1 | 3/2006 | Graham |

FOREIGN PATENT DOCUMENTS

| | | | |
|---|---|---|---|
| JP | 10119833 | * | 5/1988 |
| JP | 08-099550 | | 4/1996 |
| JP | 10 119833 | A | 5/1998 |
| JP | 2003 104246 | A | 4/2003 |
| WO | WO 2006/052595 | A | 5/2006 |

OTHER PUBLICATIONS

PCT/IL2006/000823, International Search Report mailed, Feb. 20, 2007.

PCT/IL2006/000823, International Search Report and Invitation to Pay Additional Fees, mailed Oct. 17, 2006.

International Preliminary Report on Patentability dated Jan. 24, 2008 issued in related PCT/IL2006/000823.

Translation of JP 10-119833 provided by Applicants (12 pages).

Translation of JP 08-099550 from Japanese Patent Office Web Site www.ipdl.inpit.go.jp/homepg_e.ipdl.

* cited by examiner

DRAG REDUCING SYSTEM

RELATED APPLICATIONS

This application is related to and claims priority from U.S. Provisional Patent Application Ser. No. 60/699,219 entitled: DRAG REDUCING SYSTEM, filed Jul. 14, 2005, the entire disclosure of which is incorporated by reference herein.

TECHNICAL FIELD

The disclosed subject matter relates to drag reducing systems for vehicles, including drag reducing apparatus.

BACKGROUND

Fuel efficiency in trucks is highly dependent on drag. This is because when a truck travels at speeds of over seventy miles an hour, over sixty percent of its fuel is used in overcoming drag. For example, a modern Class 8 tractor-trailer truck can weigh up to 80,000 pounds, and have a drag coefficient of around 0.60 when traveling at the common United States (US) highway speed of seventy miles per hour (mph). At this speed, approximately sixty-five percent of the truck's fuel is expended for overcoming drag.

Various drag reducing mechanisms have been proposed. However, these drag reducing mechanisms exhibit drawbacks in that they are fixed to the vehicle and can not be moved during the time the vehicle is in motion, and are not controlled based on the location of the vehicle.

SUMMARY

The disclosed subject matter improves on the contemporary art by providing drag reducing mechanisms that decrease drag, whereby fuel efficiency is increased, resulting in cost savings for the truck owner. Additionally, increased fuel efficiency is environmentally beneficial. The disclosed subject matter also utilizes Global Positioning System (GPS) technology, and other satellite-based navigational technology to determine vehicular location.

There are disclosed vehicle drag reducing systems. The systems include, at least one drag reducing apparatus for moving between a first position, where the drag reducing apparatus is in an extended position, and a second position, where the drag reducing apparatus is in a retracted position; and, a mechanism coupled to the at least one drag reducing apparatus for moving the at least one drag reducing apparatus between the first position and the second position. There is also a navigation management system, for providing the location of the vehicle and the location of obstacles along the path of the vehicle; and, a processor, electronically coupled to the navigation management system. The processor is programmed to: analyze the location of the vehicle with respect to location of an obstacle along the path of the vehicle; and, signal the movement mechanism for moving the at least one drag reducing apparatus between the first and second positions in accordance with the location of the vehicle with respect to the location of at least one obstacle along the path of the vehicle.

Also disclosed is a drag reducing apparatus, for vehicles, typically trucks (for example, tractor-trailers), buses, cars, vans and the like. The apparatus includes, a first sheet including a first curved portion and a second curved portion; a second sheet including a first curved portion, substantially in alignment with the first curved portion of the first sheet, and a second curved portion, substantially in alignment with the second curved portion of the first sheet; and, the first sheet extends at least substantially along the length of the second sheet to define, a first end, a second end for the apparatus and an airflow pathway between the sheets, the air flow pathway between the first end an the second end.

Also disclosed is a method for controlling vehicle drag. The method includes, monitoring distances between a vehicle and at least one obstacle; determining a predetermined distance between the vehicle and the at least one obstacle; and, moving a drag reducing apparatus on the vehicle from a first extended position to a second retracted position, when the vehicle is within the predetermined distance.

Also disclosed is a vehicle drag reducing system. The system includes at least one drag reducing apparatus configured for placement on a vehicle. The at least one drag reducing apparatus is for moving between a first position, where the drag reducing apparatus is in an extended position, and a second position, where the drag reducing apparatus is in a retracted position. There is a mechanism operatively coupled with the at least one drag reducing apparatus for moving the at least one drag reducing apparatus between the first position and the second position. There is an apparatus for providing the location of the vehicle, for example, a Global Positioning System (GPS) receiver, at least one storage medium for storing a location of at least one obstacle. There is also a processor in electronic communication with the apparatus for providing the location of the vehicle, and in electronic communication with the at least one storage medium. The processor is programmed to: analyze the location of the vehicle with respect to location of the at least one obstacle; and, signal the movement mechanism for moving the at least one drag reducing apparatus between the first and second positions in accordance with the location of the vehicle with respect to the location of at least one obstacle.

Also disclosed is another vehicle drag reducing system. The system has at least one drag reducing apparatus configured for placement on a vehicle. The at least one drag reducing apparatus is for moving between a first position, where the drag reducing apparatus is in an extended position (typically above the height or roof of the vehicle), and a second position, where the drag reducing apparatus is in a retracted position (typically at or below the height or roof of the vehicle). There is also a mechanism operatively coupled with the at least one drag reducing apparatus for moving the at least one drag reducing apparatus between the first position and the second position. There is a Global Positioning System (GPS) apparatus for providing the location of the vehicle, and at least one storage medium for storing a location of at least one obstacle, and at least a first predetermined distance and a second predetermined distance. There is also a processor in electronic communication with the apparatus for providing the location of the vehicle, and in electronic communication with the storage medium. The processor is programmed to: analyze the distance between the location of the vehicle and the at the location of the at least one obstacle, and at least one predetermined distance; and, provide at least one signal that will cause the movement mechanism to move the at least one drag reducing apparatus between the first and second positions depending on the analyzed distance.

Disclosed is a method for controlling vehicle drag. the method includes, providing at least one drag reducing apparatus on a vehicle, the at least one drag reducing apparatus for moving between a first position, where the drag reducing apparatus is in an extended position, and a second position, where the drag reducing apparatus is in a retracted position. At least one database is maintained for storing a location of at least one obstacle, and the location of the vehicle is obtained, for example, by Global Positioning System (GPS) technology. The location of the vehicle with respect to the location of the at least one obstacle is analyzed; and, the at least one drag reducing apparatus is moved between the first and second positions in accordance with the location of the vehicle with respect to the location of at least one obstacle.

Disclosed is another method for controlling vehicle drag. The method includes, providing at least one drag reducing apparatus configured for placement on a vehicle, the at least one drag reducing apparatus for moving between a first position, where the drag reducing apparatus is in an extended position, and a second position, where the drag reducing apparatus is in a retracted position. At least one database is maintained, for storing a location of at least one obstacle, and at least a first predetermined distance and a second predetermined distance. The location of the vehicle is then determined by Global Positioning System (GPS) technology, and the distance between the location of the vehicle and the at the location of the at least one obstacle, and at least one predetermined distance is analyzed. The at least one drag reducing apparatus is moved between the first (extended) and second (retracted) positions depending on the analyzed distance.

There is disclosed a drag reducing apparatus for a tractor-trailer. The apparatus has a cap, having a rounded portion, for fitting on the trailer of the tractor-trailer, and a skirt unit. The skirt unit is for placement on the tractor of the tractor-trailer, and includes a first skirt and a second skirt. The second skirt is movable with respect to the first skirt, and includes an internal portion correspondingly configured to the shape of the rounded portion of the cap. The second skirt is movable between an extended position into proximity with the cap, for drag reducing, and a retracted position, out of proximity with the cap.

Also disclosed is a drag reducing apparatus. The apparatus has a body portion and a head portion, the head portion being movable between a retracted position and an extended position when increased drag reduction is desired. The body portion is formed of first and second airflow members. The first airflow member has a first curved sheet, and a second sheet, in substantial alignment with the first sheet, the second sheet including curvature corresponding to the curvature of the first sheet, the first sheet and second sheet spaced apart from each other to have a gap for airflow therebetween, and the first airflow member has a first end for air ingress and a second end for air egress. The second airflow member has a first curved sheet, and a second sheet, in substantial alignment with the first sheet, the second sheet including curvature corresponding to the curvature of the first sheet, the first sheet and second sheet spaced apart from each other to have a gap for airflow therebetween, and the second airflow member has a first end for air ingress and a second end for air egress. The first airflow member and the second airflow member are joined proximate their respective second ends. The head portion is movably attached to the first airflow member, and is movable in the first airflow member at least proximate to the first end, with the movement being between the retracted position and the extended position, where at least a portion of the head portion extends out of the first airflow member.

BRIEF DESCRIPTION OF THE DRAWINGS

Attention is now directed to the drawings, where like numerals and/or characters indicate corresponding or like components. In the drawings.

DETAILED DESCRIPTION

There are disclosed systems and methods for reducing drag in vehicles, typically trucks, such as tractor-trailers, by moving drag reducing apparatus into and out of various positions, including those for maximizing drag reduction, in accordance with the location of the vehicle with respect to its distance both toward and away from an obstacle.

Throughout this document, directional references are made. These directional references, include, but are not limited to, upper, lower, front, rear, top bottom, and the like. These directional references are not intended to be limiting, but rather, are directed to typical orientations, for explanation of the disclosed subject matter.

Figure 1:
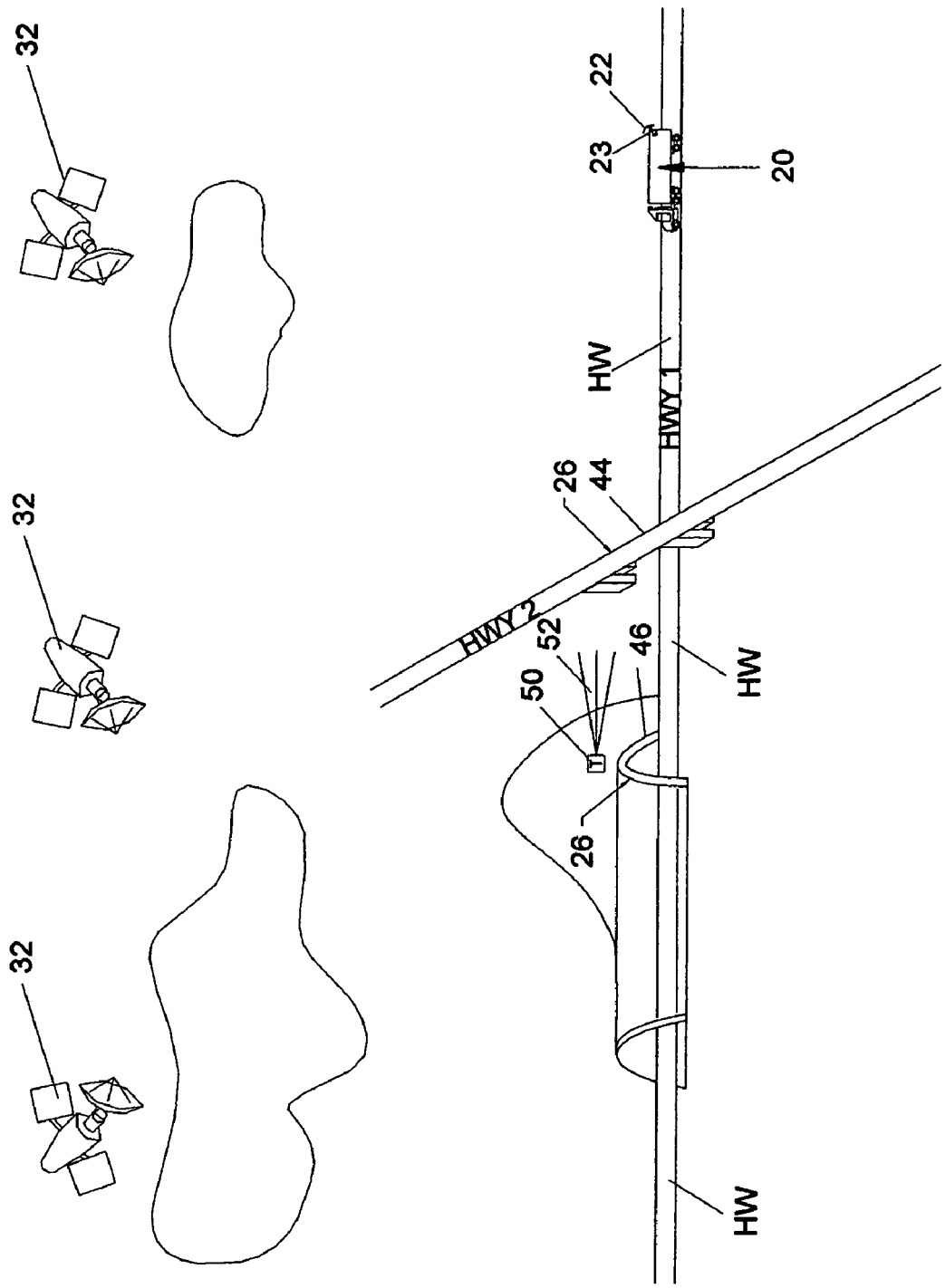
FIG. 1 is a diagram of an exemplary operation of the disclosed subject matter.

FIG. 1 shows a vehicle, for example, a truck 20 (such as a tractor-trailer, with a tractor 20' and a trailer 20"), traveling along a road, such as a highway (HW), for example the highway (HW) indicated as Highway 1. The vehicle may also be, for example, a van, bus, automobile, trailer or other road going vehicle, and also trains, and nautical vessels, such as boats and ships.

Figure 2:
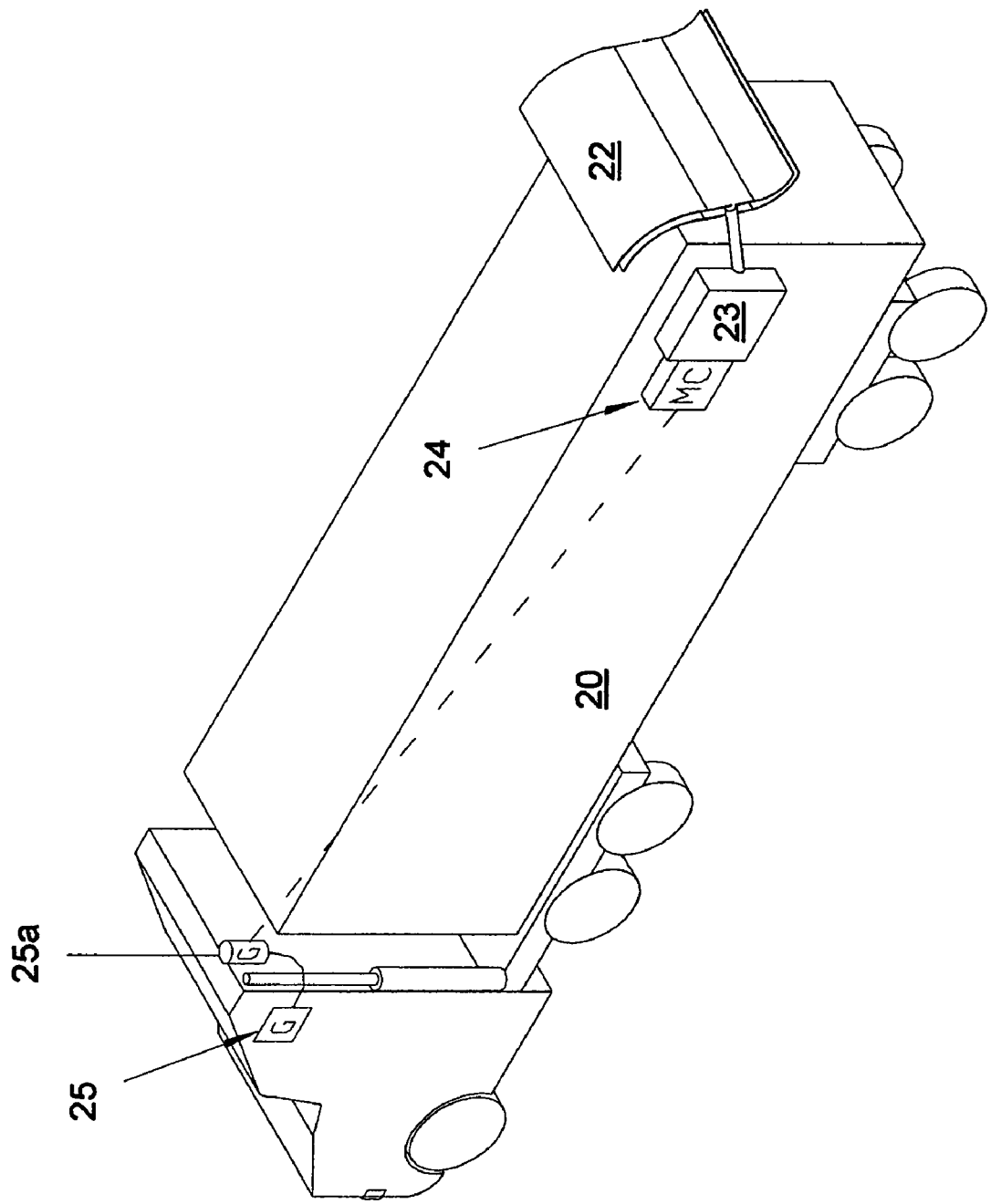
FIG. 2 is a top perspective view of a vehicle with a drag reducing apparatus in accordance with the vehicle of FIG. 1.

The truck 20 includes a drag reducing system 21, that includes a drag reducing apparatus 22, moveable between an extended position (FIG. 1 and FIG. 2) and a retracted position, by a height adjustment mechanism 23, that is electronically coupled or linked (by wired links, wireless links, or combinations thereof) with a master controller (MC) 24. The master controller (MC) 24 is electronically coupled or linked (by wired links, wireless links, or combinations thereof) with a Global Positioning System (GPS) unit 25. The movement between the extended position and the retracted position of the drag reducing apparatus 22 is necessary to avoid obstacles 26, and similarly, movement from the retracted position to the extended position when the obstacle 26 has been safely cleared and drag reduction is to be resumed (or started).

Obstacles 26, as used herein include, for example, bridges, tunnels, traffic signals (including those partially or completely overlying the roadway), signs and markers (including those partially or completely overhanging the roadway), overhanging cameras, wires, cables and lines, lights, trees, and the like. Obstacles 26, as used herein, also include, road hazards, i.e., ditches, holes, oil slicks, trees, road curvature, changes in the number of lanes on a road, road narrowing and widening, road conditions (e.g., dirt, unpaved, paved and pavement type), road construction, and nature of the road (e.g., highway, interstate or rural, city or suburban street, the like), weather conditions (e.g., rain, wind, etc.) or other conditions or features of the road that may cause driving behavior to change.

Figure 3:
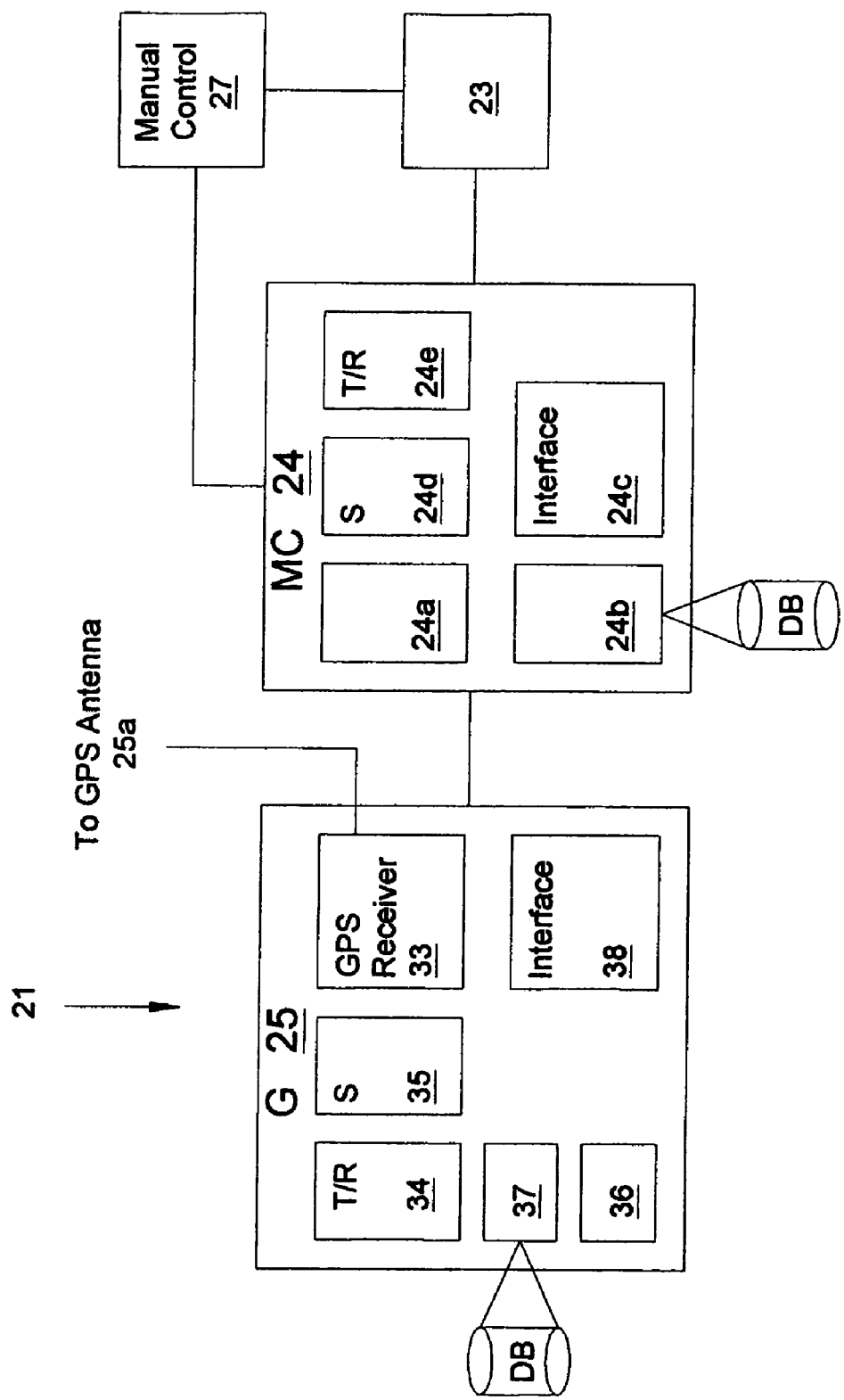
FIG. 3 is a schematic diagram of a portion of the drag reducing system of FIG. 1.

The master controller (MC) 24 is in electronic communication with the GPS Unit (G) 25, having an antenna 25a. The master controller (MC) 24 and GPS unit (G) 25 are in electronic communication, by wired links, wireless links, or combinations thereof. The height adjustment mechanism 23 is also in electronic communication with the master controller (MC) 24 by wired links, wireless links or combinations thereof. FIG. 3 shows a schematic diagram of the master controller (MC) 24, GPS unit (G) 25, and height adjustment mechanism 23.

The GPS unit (G) 25 is such that it can provide the master controller (MC) 24 with location (position) information as to the truck 20, and the location (position) of obstacles 26 (the obstacles as defined above). The GPS unit (G) 25 is also programmable to provide the master controller (MC) 24 with the distance between the truck 20 and the requisite obstacle 26. The aforementioned information is typically provided to the master controller (MC) 24 by the GPS unit (G) 25 signaling the master controller (MC) 24, or the master controller (MC) 24 polling (signaling) the GPS unit (G) 25 for this information or combinations thereof. The signaling by the GPS unit (G) and polling (signaling) by the master controller (MC) 24, are typically in intervals, for example, one second apart.

The GPS unit (G) 25 is typically also programmed to detect predetermined distances between the truck 20 and the obstacle 26, and determine if the truck 20 is within a predetermined distance toward or away from the obstacle 26. The GPS unit (G) 25 signals the master controller (MC) 24 of this predetermined distance (the truck at or within this predetermined distance), for example, the distances D (FIGS. 4-6) and V (FIG. 6), detailed below. Similarly, the master controller (MC) 24 may poll the GPS unit (G) 25 for the aforementioned predetermined distances. The interaction between the master controller (MC) 24 and GPS unit (G) 25, is in various operational modes, to generate data for activating the height adjustment mechanism 23, these operational modes are detailed further below.

The height adjustment mechanism 23 is normally subject to control by the master controller (MC) 24. The master controller (MC) 24 sends signals (by wired or wireless links, or combinations thereof), to the height adjustment mechanism 23, to adjust the height of the drag reducing apparatus 22, dependent on the location of the truck 20 with respect to an obstacle 26. However, the height adjustment mechanism 23 is subject to manual control and manual override of the master controller (MC) 24 by the truck operator, to move the drag reducing apparatus 22 between the retracted and extended positions, and vice versa, and to maintain the retracted or extended positions, if necessary. The manual override, providing the aforementioned manual control, is indicated by indicated at FIG. 3, box 27. The manual override can also be performed remotely, by a remote controller signaling a receiver in the manual controller 27, to control the requisite components.

Figure 5:
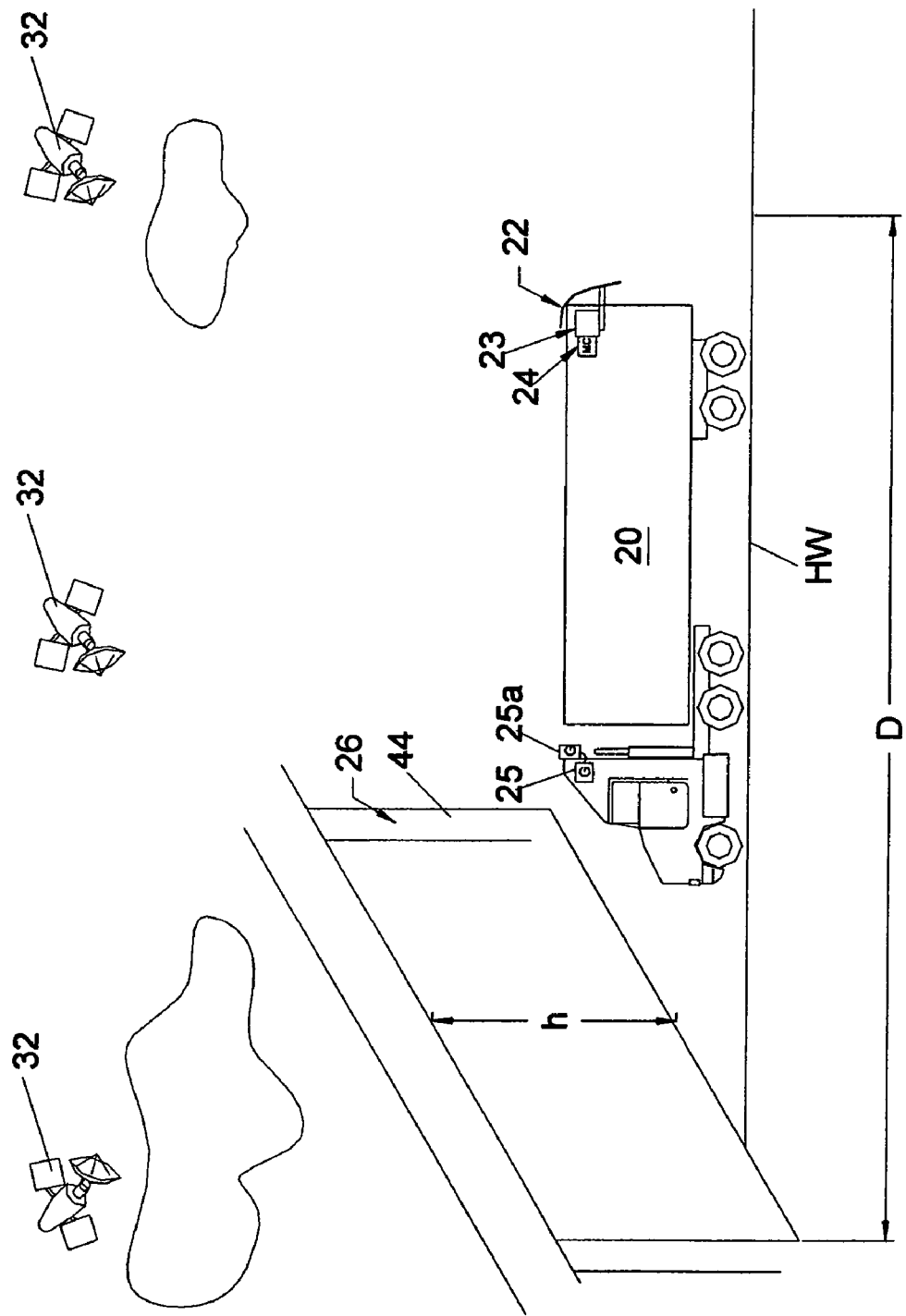

For example, when the drag reducing apparatus 22 is in the extended position, it is typically at a height (level or elevation) above the trailer 20" of the truck 20, and when in the retracted position, its height will be at least proximate to the height of the truck 20 (for example, the roof or top of the trailer 20"), as shown, for example in FIG. 5. Typically, in the retracted position, the drag reducing apparatus is at or below the height of the roof of the trailer 20".

The location of the truck 20 is detectable by Global Positioning System (GPS) technology. This GPS technology includes satellites 32 in electronic communication with a GPS receiver 33, the GPS receiver 33 part of a GPS unit (G) 25, on the truck 20. Global Positioning System (GPS) technology, including satellites and receivers, typical of satellites 32 and the receiver 33 in the GPS unit (G) 25, is disclosed, for example, in Wikipedia—Global Positioning System, available at http://en.wikipedia.org/wiki/GPS, and attached hereto as Appendix A.

The master controller (MC) 24 is a computer or computer type device, programmed to activate the height adjustment mechanism 23, for moving the drag reducing apparatus 22, on the truck 20. It includes a processor 24a, for example, a Pentium® based processor(s), capable of running algorithms, programs and the like, and associated storage media 24b, for storing databases and the like, and interfaces 24c suitable for interfacing with networks, including local area networks LANs, Wide Area Networks (WANs), including public networks such as the Internet, by wired or wireless links. There are typically sensors (S) 24d for monitoring the speed of the vehicle, electrically linked (by wired links, wireless links, or combinations thereof) to the processor 24a. The master controller (MC) 24 also includes a transmitting and receiving unit (T/R) 24e, for wired and wireless communications with the GPS unit (G) 25 and the height adjustment mechanism 23. The master controller (MC) 24 is suitable to be updated by software downloads from CD's or other storage means as well as the Internet from a host server or the like, by wired links, wireless links or combinations thereof.

Exemplary databases in the master controller (MC) 24, include, for example, databases for locations of obstacles (the obstacles defined above) as preprogrammed or downloaded into the database, as well as various predetermined distances, such as D, D' and V, detailed below. The master controller (MC) 24 also runs analytical and comparison programs, as well as programs for locations of obstacles, determining the vehicle location with respect to predetermined distances where the drag reducing apparatus 22 is to be raised to the extended position, lowered to the retracted position, or maintained in the respective extended or retracted positions, identifying data and signals and sending data and signals to and from the GPS unit (G) 25. The master controller (MC) 24 may also have hardware, software and the like for interfacing (interfaces 24c) with networks such as the Internet, or for receiving communications such as Bluetooth communications, in order to download software programs from locations on the Internet, compact discs (CDs) and other storage media, databases, updates thereto, and the like. These interfaces 24c may also be configured to receive data in real time.

The GPS unit (G) 25 includes the aforementioned GPS receiver 33, that determines the location or position of the vehicle. This location data may be used to determine the speed of the vehicle, that is utilized by the GPS Unit (G) 25 and/or the master controller (MC) 24, when speed is one of the parameters for the requisite application (such as secondary adjustment of the drag reducing apparatus 22 detailed below). The GPS unit (G) 25 is electronically coupled with a signaling unit or transmitter/receiver (T/R) 34, for sending and receiving data, by signals (over wired and wireless links) or the like, to the master controller (MC) 24 on the truck 20 (the signals shown in broken lines in FIG. 2).

The GPS unit (G) 25, typically also includes, processors 35 and microprocessors, and the like, and other hardware and/or software for running programs, such as comparison programs, and for communication with other components on or associated with the drag reducing apparatus 22 and/or the truck 20. There may also be sensors (S) 36 for monitoring the speed of the vehicle, electrically linked (by wired links, wireless links, or combinations thereof) to the processor 35. There are also memory devices and hardware include storage media 37, suitable for storing databases (DB), database information, and the like. The GPS unit (G) 25 also includes hardware, software and combinations thereof that serve as interfaces 38 for receiving data from networks, such as the Internet, Bluetooth communications, and the like. These interfaces 38 may also be configured to receive data in real time.

Exemplary databases include databases for locations of obstacles (the obstacles defined above) as preprogrammed or downloaded into the database, as well as various predetermined distances, such as D, D' and V, detailed below. Exemplary applications include comparison programs, sending and receiving data and signals to or from the master controller (MC) 24 algorithms and the like. The GPS unit (G) 25, including its databases, is typically programmed and updated by software downloads from CD's or other storage means as well as the Internet, by wired or wireless links.

For the predetermined distances, when the drag reducing apparatus 22 must be moved from the extended position to the retracted position when traveling toward an obstacle, and when the drag reducing apparatus 22 may be moved from the retracted position to the extended position, when the vehicle has safely cleared the obstacle moving away from the obstacle, for example, the respective distances D, D' and V detailed above and below, these predetermined distances can be preprogrammed. They may also be programmed into the respective master controller (MC) 24 and GPS unit (G) 25 so as to be variable based on the detected speed of the vehicle (by any of the methods detailed above). They can also be determined dynamically and "on the fly" by algorithms (programmed into the master controller (MC) 24 and/or the GPS unit (G) 25 that utilize the detected speed and calculate the requisite time for changing the respective position of the drag reducing apparatus 22.

The interaction between the master controller (MC) 24 and the GPS unit (G) 25, to determine the position of the truck 20 with respect to the requisite obstacle 26, and the determination of the position of the drag reducing apparatus 22, should be maintained, or changed, from the extended position to the retracted position, or from the retracted position to the extended position, involving signaling the height adjustment mechanism 23 by the master controller (MC) 24, is in accordance with the modes detailed below. While only a single mode need be in operation, typically multiple modes are in operation so as to be redundant, for safety purposes.

In a first exemplary mode, the GPS unit (G) 25 is programmed to detect the distance between the truck 20 and an obstacle 26. The location of the truck 20 is determined by the GPS receiver 33 (and the satellites 32 and the antenna 25a), and the location of the obstacle 26 (obstacles being defined above) was programmed into and stored in the GPS unit (G) 25.

Figure 4:
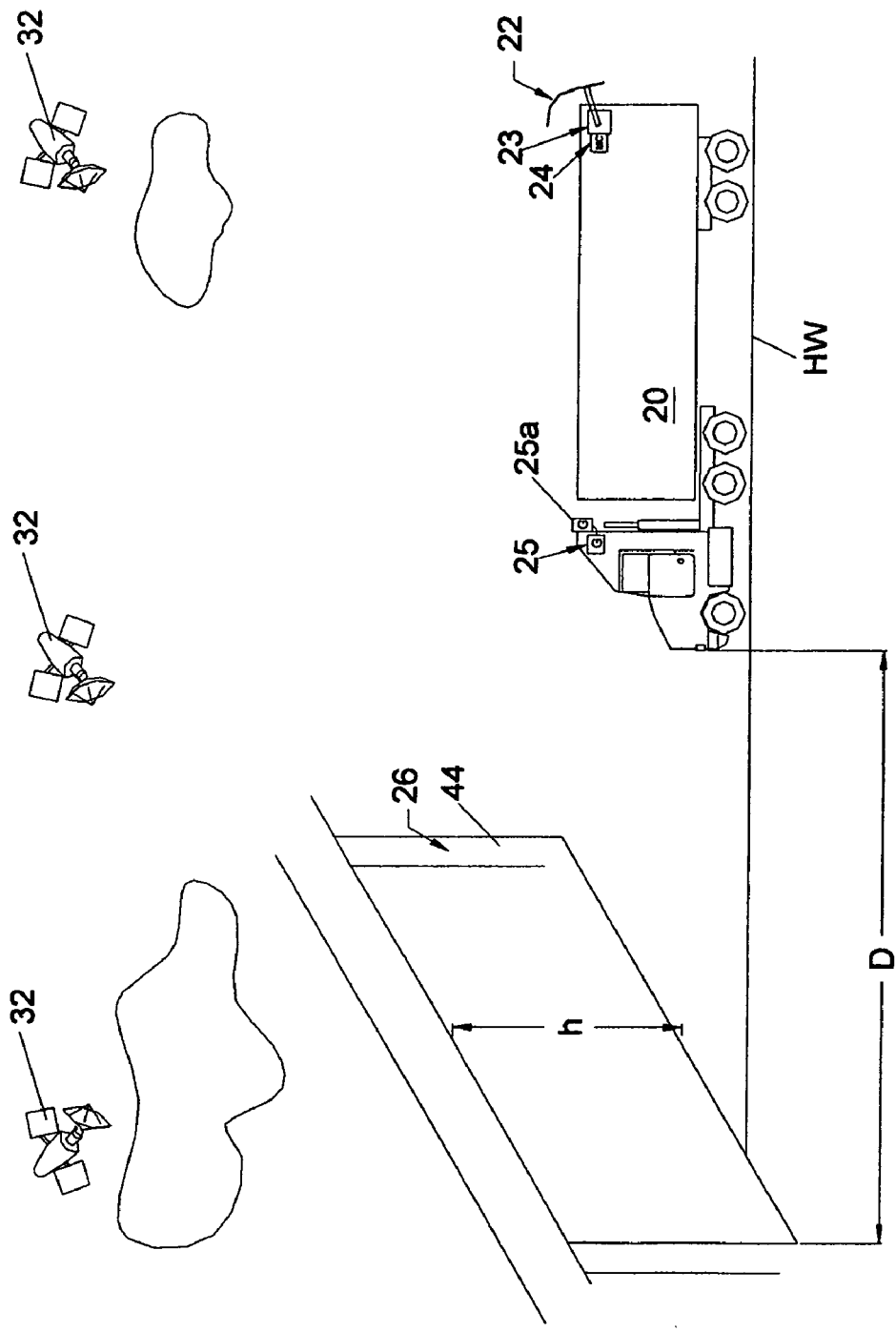
FIGS. 4 and 5 are diagrams of the exemplary operation of the embodiment of FIG. 1.
Figure 6:
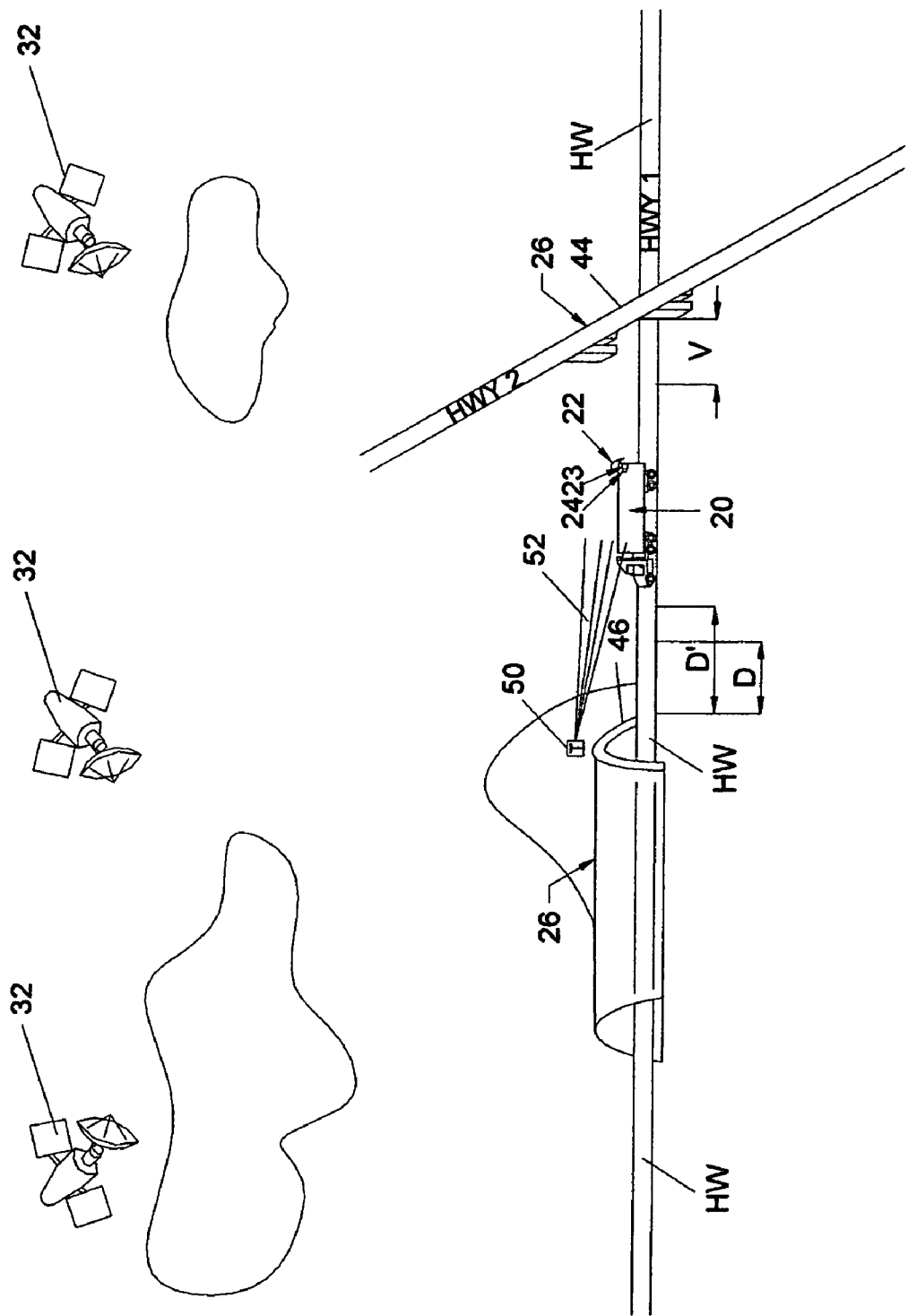
FIG. 6 is a diagram of an exemplary operation of an alternate embodiment of FIG. 1; and, FIGS. 7A and 7B are sectional views a drag reducing apparatus in accordance with embodiments of the disclosed subject matter.

The GPS unit (G) 25 is, for example, programmed to calculate the distance between the truck 20 and the obstacle 26, and send a signal to the master controller (MC) 24, when the truck 20 is within a predetermined distance from (both going toward and moving away from) the obstacle 26 (the predetermined distances programmed into the GPS unit (G) 25. For example, the predetermined distance toward to obstacle may be the distances represented by D, as shown in FIGS. 4-6 and detailed below, while a predetermined distance away from the obstacle 26 (a safe clearance distance) may be the distance represented by V, as shown in FIG. 6.

Once the master controller (MC) 24 receives this signal of the truck 20 being at or within a predetermined distance, it signals the height adjustment mechanism 23 to lower the drag reducing apparatus 22 to the retracted position. Similarly, once the master controller (MC) 24 receives a signal that the truck 20 is beyond a predetermined distance from the obstacle 26 (such that the obstacle 26 is cleared), it signals the height adjustment mechanism 23 to raise the drag reducing apparatus 22 to the extended position.

Alternately, the master controller (MC) 24 is programmable to recognize signals from the GPS Unit (G) 25, when the truck 20 is at or within predetermined distances toward (for example, D), or away from (for example, V) the obstacle 26, or outside of these predetermined distances. The GPS unit (G) 25 calculates the distance between the truck 20 and the obstacle 26 continuously, and at regular intervals, for example one second apart, and compares this distance to stored predetermined distances (for example, the distances D and V), and sends one or more signals to the master controller (MC) 24, the signals corresponding to whether the truck 20 is at or within the predetermined distances (D or V). The signals are typically sent, from the GPS unit (G) 25 to the master controller (MC) 24 at regular intervals, for example, one second apart.

If outside of the predetermined distances, a signal is sent from the GPS unit (G) to the master controller (MC) 24, that is recognized by the master controller (MC) 24 (that the truck 20 is outside of the predetermined distances D or V), that signals the height adjustment mechanism 23, that the drag reducing apparatus 22 is to be moved (raised) or maintained (if already raised) in the extended position. Oppositely, if at or inside of the predetermined distances, a signal is sent from the GPS unit (G) to the master controller (MC) 24, that is recognized by the master controller (MC) 24 (that the truck 20 is at or within the predetermined distances D or V), that signals the height adjustment mechanism 23, that the drag reducing apparatus 22 is to be moved (lowered) or maintained (if already lowered) to the retracted position.

Alternately, the master controller (MC) 24 may poll (signal) the GPS unit (G) 25 for any of the aforementioned signals, and operate in accordance with the aforementioned mode for raising (moving to the extended position), and lowering (moving to the retracted position) the drag reducing apparatus 22, as well as maintaining it in the retracted or extended position. Also alternately, the aforementioned mode can be operated by any combinations of signaling from the GPS unit (G) 25 to the master controller (MC) 24 or polling by the master controller (MC) 24 of the GPS unit (G) 25.

In this first exemplary mode, the clearance distance (for example, distance V) is only considered cleared, whereby the master controller (MC) 24 signals the height adjustment mechanism 23 to move (raise) the drag reducing apparatus 22 to the extended position, when the truck is outside of the predetermined distance (for example, the distance D toward the obstacle 26). Otherwise, the GPS Unit (G) 25 and/or master controller (MC) 24 recognize the truck 20 as at or within the predetermined distance approaching the obstacle 26 (for example, the distance D), and function accordingly, to cause the master controller (MC) 24 to cause the height adjustment mechanism 23 to maintain the drag reducing apparatus 22 in the retracted position (or lower it to the retracted position, if for some reason it was in the extended position).

In a second exemplary mode, the GPS unit (G) 25 may be programmed to report (signal) vehicle (truck 20) position to the master controller (MC) 24, as well as the location for the requisite obstacle 26 (stored in its database 37). This signaling is typically at regular intervals, for example, one second apart.

The master controller (MC) 24 calculates the distance between these two positions (locations) and compares it to preprogrammed or programmed predetermined distances (such as D and V) for signaling the height adjustment mechanism 23, to raise, lower, or maintain the position of the drag reducing apparatus 22, as detailed above.

For example, if the master controller (MC) 24 determines that the truck 20 is at or within the predetermined distance toward the obstacle 26, for example, the distance represented by D, the master controller (MC) 24 signals the height adjustment mechanism 23 to move (lower) the drag reducing apparatus 22 to the retracted position. If the drag reducing apparatus 22 has been lowered to the retracted position, as long as the truck 20 remains within predetermined distances D or V, the master controller (MC) 24 will signal the height adjustment mechanism 23 to maintain the drag reducing apparatus 22 in the retracted position. Once the truck 20 is away from the obstacle 26, outside the predetermined distance, for example, the distance represented by V, but not at or within the predetermined distance D, the master controller (MC) 24 signals the height adjustment mechanism 23 to move (raise) the drag reducing apparatus 22 to the extended position. If the drag reducing apparatus 22 has been raised to the extended position, as long as the truck 20 remains outside predetermined distances D or V, the master controller (MC) 24 will signal the height adjustment mechanism 23 to maintain the drag reducing apparatus 22 in the extended position.

In a third exemplary mode, the master controller (MC) 24 obtains the location of the vehicle (i.e., truck 20) by polling the GPS Unit (G) 25 for location of the vehicle, or by receiving signals from the GPS unit (G) 25, as detailed above. The polling and signal sending are typically at regular intervals, for example, one second intervals. The master controller (MC) 24 then correlates this location to the location of the requisite obstacle 26, based on the obstacle information in its database(s) 24c, and determines the distance between the vehicle (i.e., truck 20) and the required obstacle 26.

The master controller (MC) 24 having determined the distance between the truck 20 and the obstacle 26, then determines if this distance is at or within any predetermined distances, where the drag reducing apparatus 22 is to be in the retracted position, such as, for example, distances D and V. The master controller (MC) 24 and height adjustment mechanism 23 then perform in accordance with the second exemplary mode, detailed above, to raise, lower and maintain the drag reducing structure 22, in the respective extended and retracted positions.

While three exemplary modes have been described in detail above, this is exemplary only. Numerous other modes for calculating the distance between the vehicle and the obstacle, and comparing the calculated distance with a predetermined distance, this predetermined distance providing sufficient time, particularly for lowering the drag reducing apparatus 22 to the retracted position from the extended position, or for raising the drag reducing apparatus 22 from the retracted position to the extended position, are also possible. Other modes for maintaining the drag reducing apparatus 22 in the raised (extended) position or lowered (retracted) position, once moved to these respective positions, are also possible.

In all of the exemplary modes, as detailed above, the height (level) of the drag reducing apparatus 22, when in the extended position, is further adjustable, in a secondary adjustment, based on the speed of the vehicle. The speed of the vehicle is detected, for example, by the GPS unit (G) 25 as detailed above, or through sensors or a speedometer reading, by the GPS unit (G) or the master controller (MC) 24. When the speed is detected by the GPS unit (G) 25, is obtained by the master controller (MC) 24 by either being signaled from the GPS unit (G) 25 or the master controller (MC) 24 polling the GPS unit (G) 25 for the speed (speed data).

By making this further or secondary adjustment (the master controller (MC) 24, signaling the height adjustment mechanism 23 to adjust the drag reducing apparatus 22), drag reduction in the vehicle is enhanced. Vehicles traveling at higher speeds will have the drag reducing structure at a lower height or level (from the roof or other upper level, for example, the trunk of an automobile, or level from the retracted position of the vehicle), as compared the height or the level of the drag reducing apparatus 22 when the vehicle is traveling at lower speeds.

The actual heights or levels for the drag reducing apparatus 22 in accordance with the speed of the vehicle, when the drag reducing apparatus 22 is in the extended position, are programmed into the master controller (MC) 24 by any of the methods detailed above. For example, the level of the drag reducing apparatus 22 in the truck 20 traveling at 70 miles per hour (mph), will be lower than the level when the truck 20 is traveling at 50 mph, which will be lower than when the truck 20 is traveling at 35 mph.

An alternate secondary adjustment of the drag reducing apparatus can be made for atmospheric conditions such as temperature, pressure, etc., as detected by sensors for these conditions electrically linked to the master controller (MC) 24. The master controller (MC) 24 can be programmed for example, such that a cold temperature will cause a lowering of the drag reducing apparatus 22 (from the height of the drag reducing apparatus 22 in the extended position), while a warmer temperature will cause a raising of the drag reducing apparatus 22 (from the height of the drag reducing apparatus 22 in the extended position).

One or more of the aforementioned secondary adjustments may be programmed into the master controller (MC) 24. However, these secondary adjustments are optional, and need not be programmed into the master controller (MC) 24 for proper operation of the drag reducing apparatus 22.

For example, turning also to FIGS. 4-6, a truck 20 is driving along Highway 1 (HW). Highway 1 has two obstacles, a bridge 44 and a tunnel 46. Initially, the truck 20, is at a distance greater than D from an obstacle 26, and a such, at least a portion of the drag reducing apparatus 22 on the truck 20 is at an elevation above the truck 20, in an extended position, serving to reduce drag on the truck 20.

Once it is determined, by any one or more of the operative modes detailed above, that the truck 20 is at or within a distance D from the obstacle 26, for example, the bridge 44, as shown in FIG. 4, the master controller (MC) 24 signals the height adjustment mechanism 23 to move (lower) the drag reducing apparatus 22 to the retracted portion, as shown in FIG. 5.

This distance D is typically a distance that provides enough time for the height mechanism 23 to lower the drag reducing apparatus 22 to the retracted position, with the truck 20 traveling at normal highway speeds, approximately 55 to 70 mph. However, for safety, D is typically longer. This distance D, may be for example, approximately 1 to 4 miles.

As shown in FIG. 5, for example, the truck 20 is within the predetermined distance D from the obstacle 26. This distance is continuously detected by the GPS Unit (G) 25, and the master controller (MC) 24, operating as detailed above, to maintain the drag reducing apparatus 22 in the retracted position. This signaling prevents the drag reducing apparatus 22, now at a height less than height "h" (having been retracted in response to a signal from the master controller (MC) 24), from contacting the obstacle 26 of height "h" in FIG. 3 (or being too close to the height of the obstacle), and causing damage to the obstacle and the truck 20.

Turning to FIG. 6, similarly, when the truck 20 has cleared the obstacle 44 by a distance V (the distance V as preprogrammed into the GPS unit (G) 25 and/or the master controller (MC) 24), a second predetermined distance, and there is not another obstacle a distance approximately D (or an additional distance from D as programmed into the GPS Unit (G) 25 or the master controller (MC) 24) from the truck 20, the master controller (MC) 24 will signal the height adjustment mechanism 23 to move the drag reducing apparatus 22 to the extended position, automatically. The distance V is typically less than the distance D, but could be equal to or greater than D, as programmed into the master controller (MC) 24 and/or GPS unit (G) 25.

Additionally, as shown in FIG. 6, in a backup system, a transmitter (T) 50 or transmitters may be mounted on or proximate to an obstacle 26, for example, the tunnel 46. The transmitter (T) 50 sends a signal 52 detectable by the transmitting/receiving unit 37 of the GPS unit (G) 25 or the transmitting/receiving unit 24*d* of the master controller (MC) 24. Additional transmitters, similar to the transmitter 50 may be placed in front of the transmitter(s) 50 on the highway or an obstacle 26, if a further factor of safety is desired (extending the distance D', as detailed below).

Should the truck 20 be at or within the predetermined distance, for example represented by D'(D' being, for example, the range or distance of the signal 52 from the transmitter 50), with respect to the obstacle 46, the GPS unit (G) 25 and the master controller (MC) 24 will operate in a mode to cause the master controller (MC) 24 to signal the height adjustment mechanism 23. This signal(s) causes the height adjustment mechanism 23 to lower the drag reducing apparatus 22 on the truck 20 to the retracted position, (and maintain it in this retracted position, until the distance V is safely cleared), as detailed above.

The distance D' is typically greater than the distance D, in order that the signal from the transmitter (T) 50 be received in proper time to move the drag reducing structure 22 to its retracted position, as the GPS Unit (G) 25 and/or master controller (MC) 24 are programmed to treat the distance D' like the distance D (to cause the height adjustment mechanism 23 to move the drag reducing apparatus 22 to the retracted position). Alternately, this distance D' could be equal to or less than the distance D, provided there is sufficient time for movement of the drag reducing structure 22 to its retracted position.

Figure 7A:
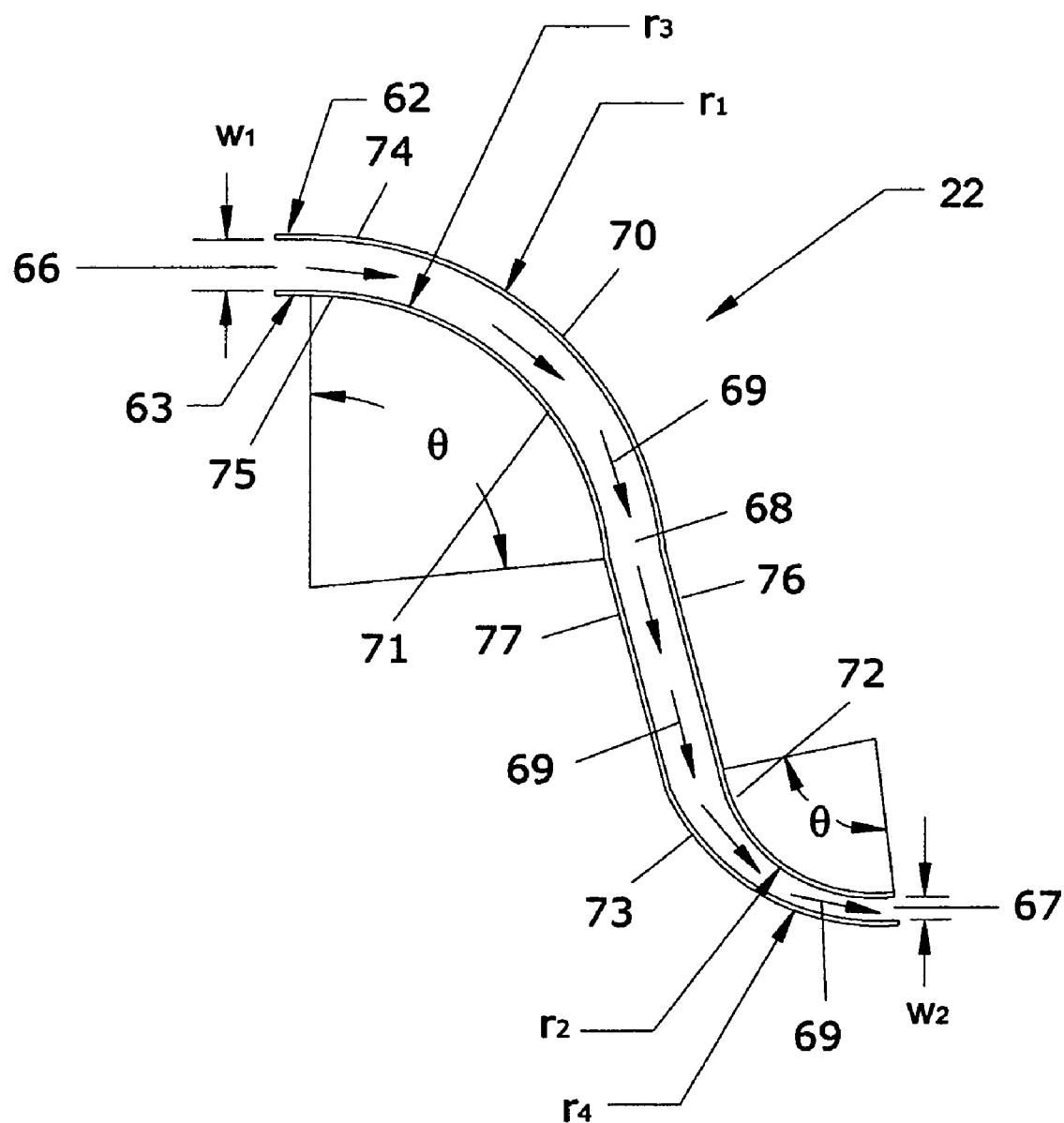

FIG. 7A shows an exemplary drag reducing apparatus 22 for use on the truck 20. The structure 22 includes two sheets 62, 63, typically made of metal, polymers or the like. The sheets 62, 63 are arranged with respect to each other, such that the width ($w_1$) of the ingress opening 66 (through which air enters when in the extended position) between the sheets 62, 63 is greater than width ($w_2$) of the egress opening 67 (through which air exits when in the extended position) between the sheets 62, 63. The sheets 62, 63 are held together by one or more spacers (not shown), attached by conventional mechanical fasteners and/or chemical fasteners, such as adhesives.

In a typical orientation, the sheet 62 is the top, upper or first sheet, while the sheet 63 is the bottom, lower or second sheet, defining a cavity 68 between the sheets 62, 63. Air flow between the sheets 62, 63, in the aforementioned typical orientation, is in accordance with the arrows 69.

The sheets 62, 63 are typically "S" or serpentine shaped, with two arced portions 70, 71 (concave, as per the orientation of the sheets 62, 63 and airflow direction, shown here), and 72, 73 (convex, as per the orientation of the sheets 62, 63 and airflow direction, as shown here) common to both sheets 62, 63, intermediate linear portions 74, 75, 76, 77. Each sheet 62, 63, has two radii of curvature. In the first, sheet 62, the first arced portion 70 has a radius if curvature of $r_1$, and the second arced portion 72 has a radius of curvature of $r_2$. In the second sheet 63, the first arced portion 71 has a radius of curvature of $r_3$, and the second arced portion 73 has a radius of curvature of $r_4$. These radii of curvature ($r_1$-$r_4$) are related to each other by the following relation:

$$r_2 < r_4 < r_3 < r_1$$

Additionally, the arced portions 70, 71, 72 and 73 extend through arcs of 0 degrees, for example, approximately 85°. However, with the arcs of the arced portions 70-73, one or more arcs may be the same and any of the arcs may be different from each other.

In an alternate embodiment of the deflecting structure 22, the upper sheet 63 may include openings, single or multiple, to allow air flow out of the area between the upper 62 and lower 63 sheets as well as through the openings. These openings may be arranged in any number of ordered patterns or may be randomly positioned. These openings can be of a single or multiple sizes, and may be apertures or slots.

Figure 7B:
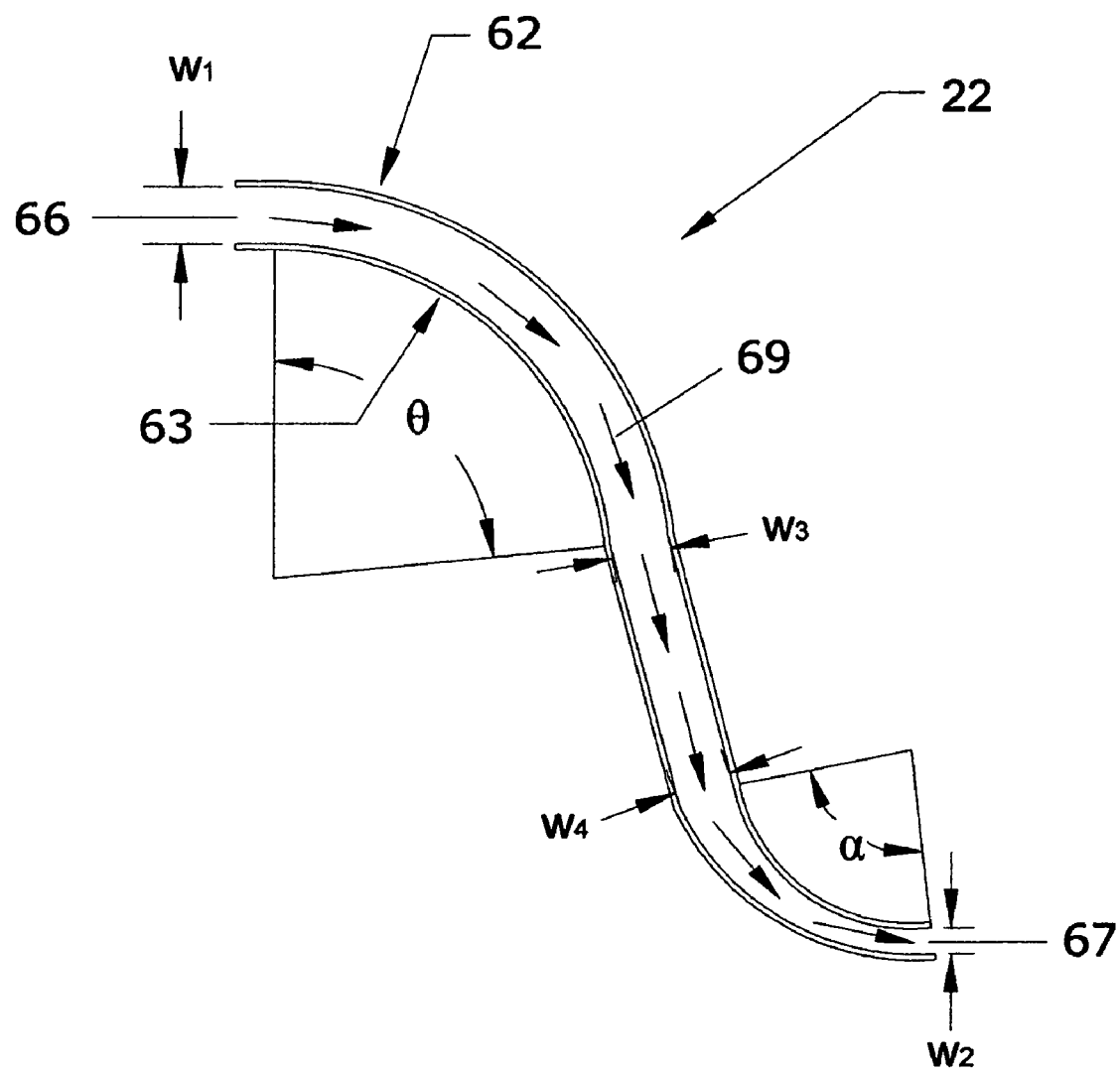

FIG. 7B shows an alternate configuration 22' of the drag reducing apparatus 22 of FIG. 7A, similar to the drag reducing apparatus 22, except where indicated. In this apparatus 22', the upper sheet 62 is spaced evenly from the lower sheet 63 over the length of the entire drag reducing apparatus 22'. Four exemplary widths $w_1'$-$w_4'$ are shown, with $w_1'$ being the width at the ingress opening 66, $w_4'$ being the width at the egress opening 67, and, $w_3'$ and $w_4'$ being the widths at points intermediate the arcs. There are two major arcs, whose curvature is represented by $\phi$ and $\alpha$. These arcs, $\phi$ and $\alpha$, are typically different, with the arc represented by $\phi$ being, for example, approximately 85°, and the arc represented by $\alpha$ being, for example, approximately 67°.

Alternately, a drag reducing apparatus may only involve a single sheet. This single sheet could be any of the sheets or a portion of one of these sheets, such as a sheet from the apparatus 22 of FIG. 7A or the apparatus 22' of FIG. 7B, as detailed above.

Figure 8:
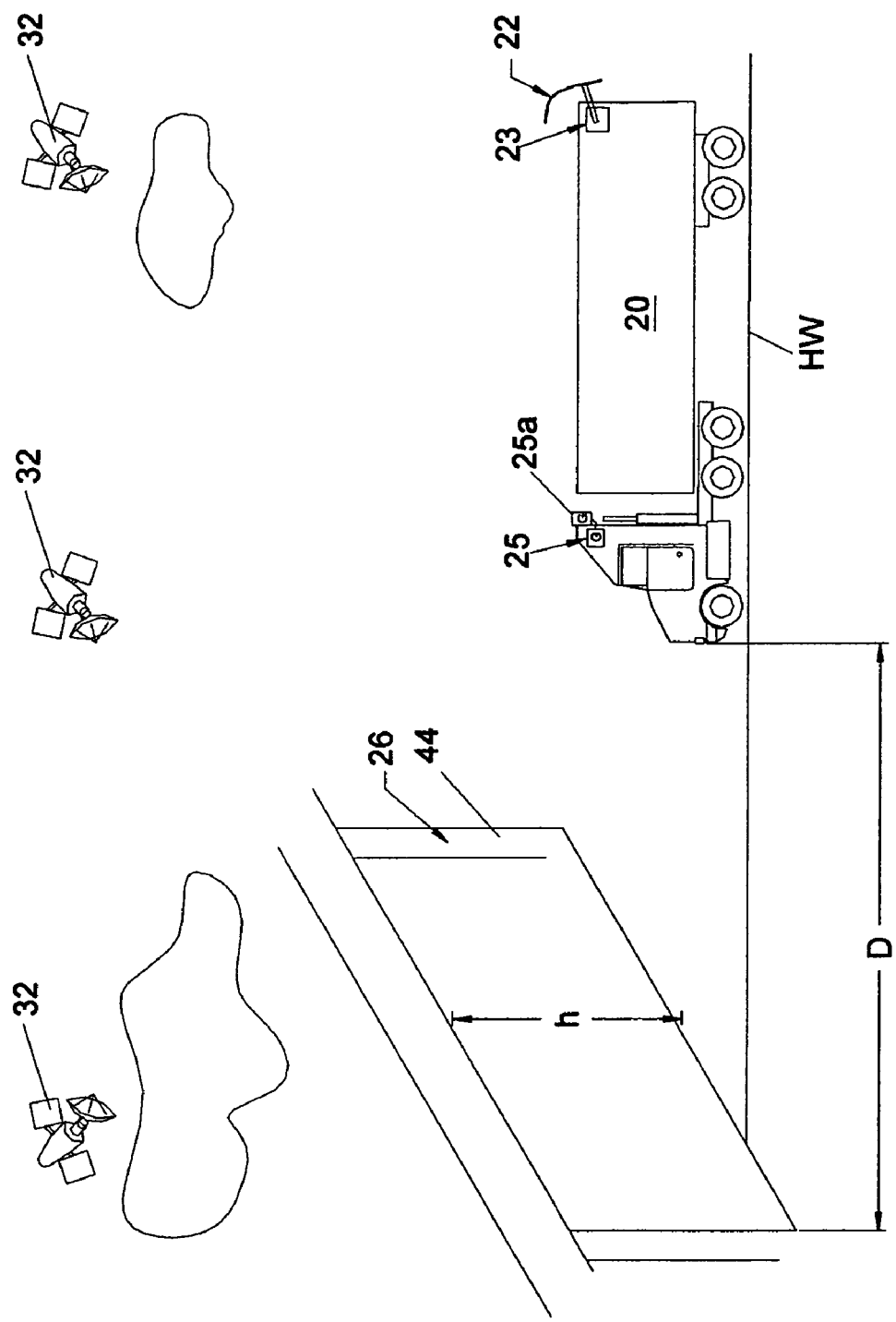
FIGS. 8-10 are diagrams of an alternate embodiment in an exemplary operation.
Figure 9:
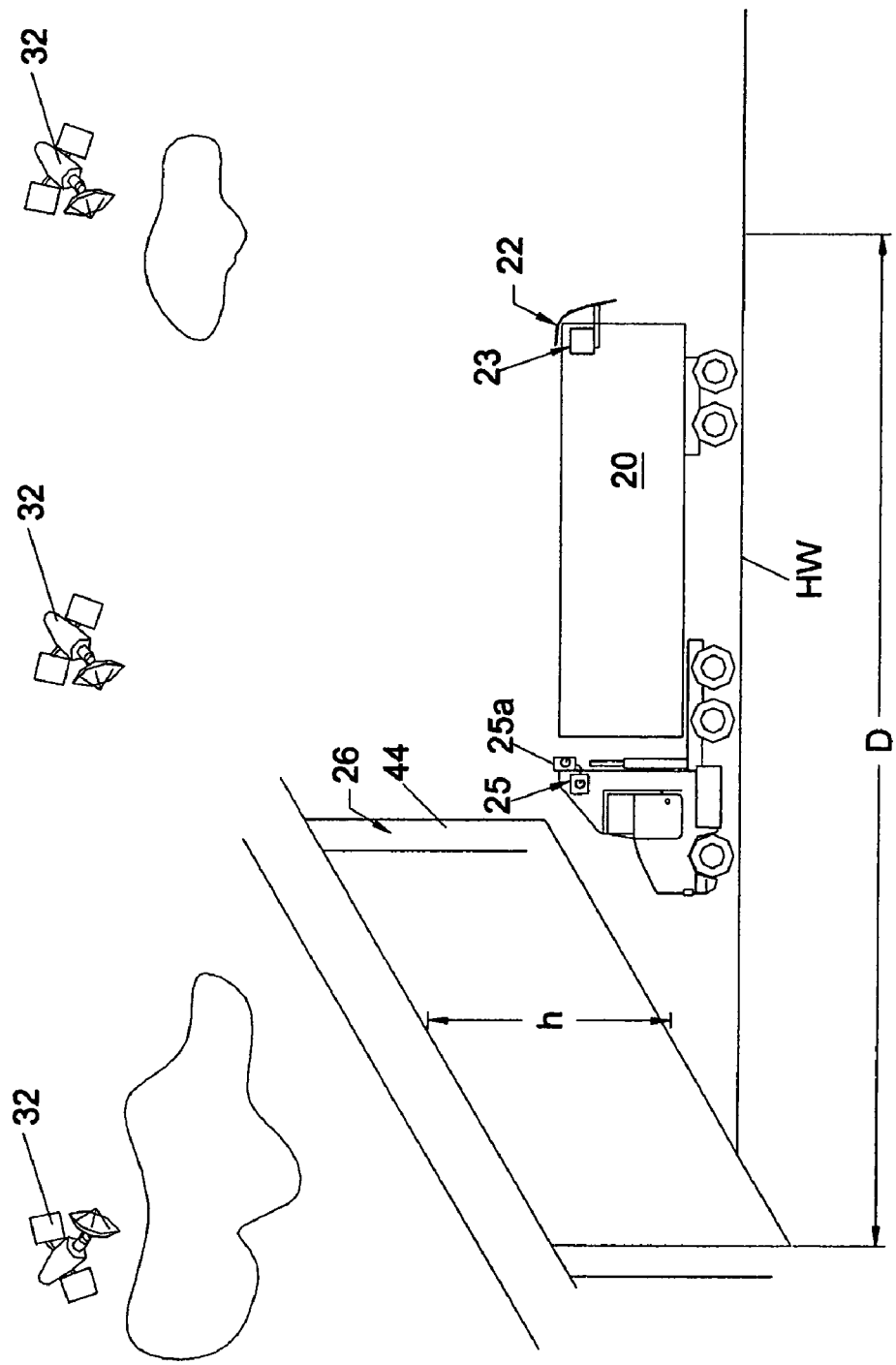
Figure 10:
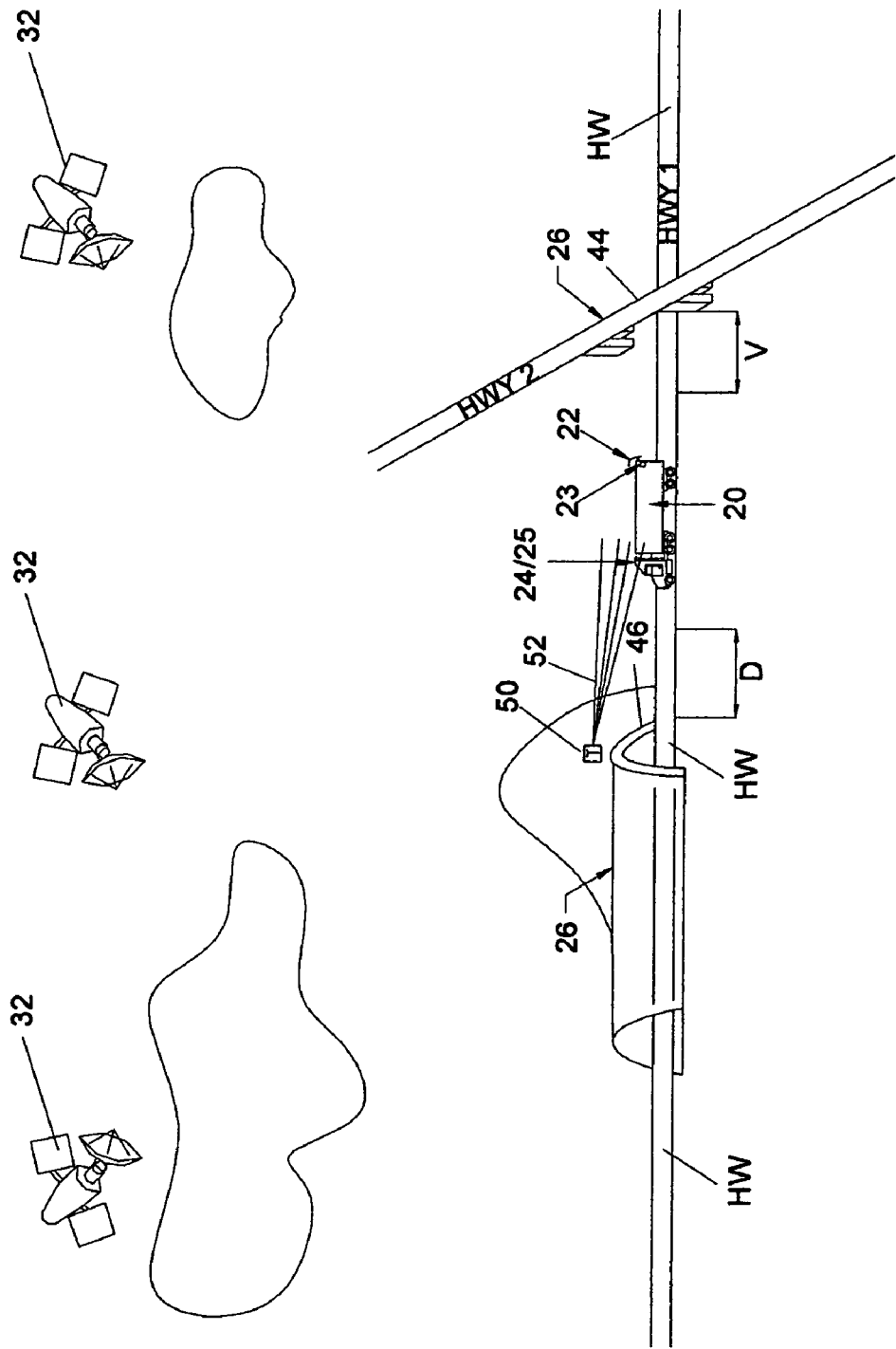

FIGS. 8-10 show an alternate configuration of the master controller (MC) 24 and the GPS unit (G) 25. Here, the master controller (MC) 24 and the GPS unit (G) 25 have been placed together for use in the tractor 20' of the truck 20. The master controller (MC) 24 (via a transmitter, not shown) sends signals (shown by the broken lines in FIG. 8) to the height adjustment mechanism 23 (to a receiver therein, not shown) by wired links, wireless links, or combinations thereof. In this alternate configuration, the master controller (MC) 24 and GPS unit (G) 25 can be together as a single device, or separate, as multiple devices. Functioning of the components of this alternate configuration is the same as detailed above and shown in FIGS. 1-6.

Figure 11:
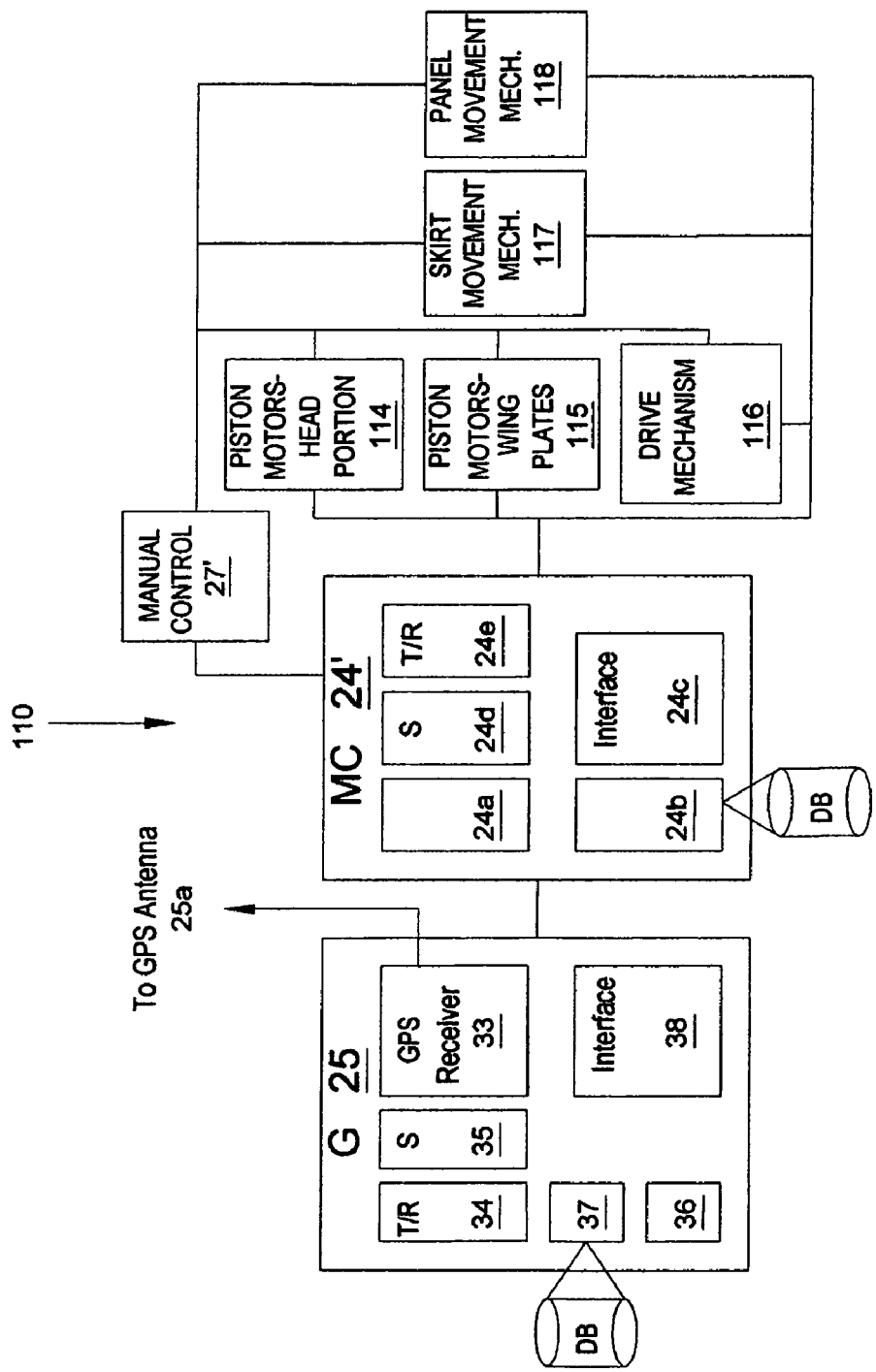
FIG. 11 is a schematic diagram of a portion of an alternate drag reducing system.

FIG. 11 shows a schematic for an alternate system 110 for drag reduction in trucks and other vehicles. The system 110 is installed on trucks similar to that show in FIGS. 1-7B above, with the differences indicated below. The system 110 includes components identical to and similar to those for the schematic of FIG. 3, detailed above, with similar components indicated by primes (') after the element number. These elements function similarly to these detailed above, with differences indicated below. The system also includes drag reducing apparatus 122, 322 and 422. These drag reducing apparatus 122, 322, 422, may be part of the system 110 alone or in any combination.

These drag reducing apparatus 122, 322, 422 are subject to control by a master controller (MC) 24', and associated electronics and mechanical mechanisms for moving the drag reducing apparatus 122, 322, and 422 between the retracted position and the extended position, when drag reduction is desired, similar to the retracted and extended positions detailed above for the system 21. The master controller (MC) 24' is similar to the master controller (MC) 24 detailed above, accept that it is connected to mechanisms for moving each of the drag reducing apparatus 122, 322, 422, and is indicated accordingly. Coupled with the GPS unit (G) 25, the master controller (MC) 24' is operative in the modes for determining distances to and from an obstacle, and moving the drag reducing apparatus 122, 322, and 422, as detailed above.

The system 110 is such that any one, two or all of the drag reducing apparatus 122, 322 or 322', 422 may be operative at any one time. The operativeness of any of the drag reduction apparatus 122, 322 or 322', 422 is selected by the operator via a manual override in a manual controller 27' (similar to the manual override of the manual controller 27 detailed above), that signals the master controller (MC) 24' of the operative and activated drag reducing apparatus 122, 322 or 322', 422.

The master controller (MC) 24' controls: motors 114, 115 for moving pistons 130, 178 to move the head portion 124 and wing plates 176a, 176b, respectively on the drag reducing apparatus 122, a drive mechanism 116, for moving the drag reducing apparatus 122 between operative and active positions, and a storage position (FIGS. 12G-12I), a skirt movement mechanism 117 (FIGS. 13A-13C) for adjusting the positions of the skirts of drag reducing apparatus 322, and, a panel movement mechanism 118, for moving the pistons 428 associated with the lateral or side panels 424a, 424b on the tractor 20" (FIGS. 14A-14D). The piston motors 114, 115, drive mechanism 116, skirt movement mechanism 117 and panel movement mechanism 118 are also subject to control of the manual controller 27', as detailed below.

Figure 12A:
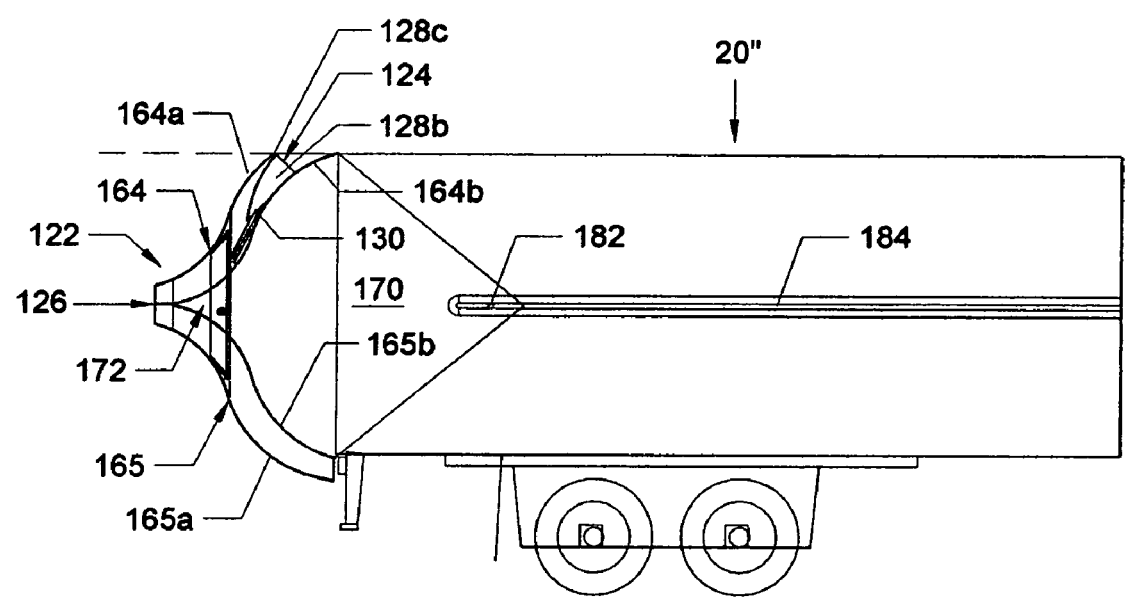
FIG. 12A is side view of an alternate drag reducing apparatus on a trailer of a truck in a retracted position, that is part of the alternate drag reducing system of FIG. 11.
Figure 12B:
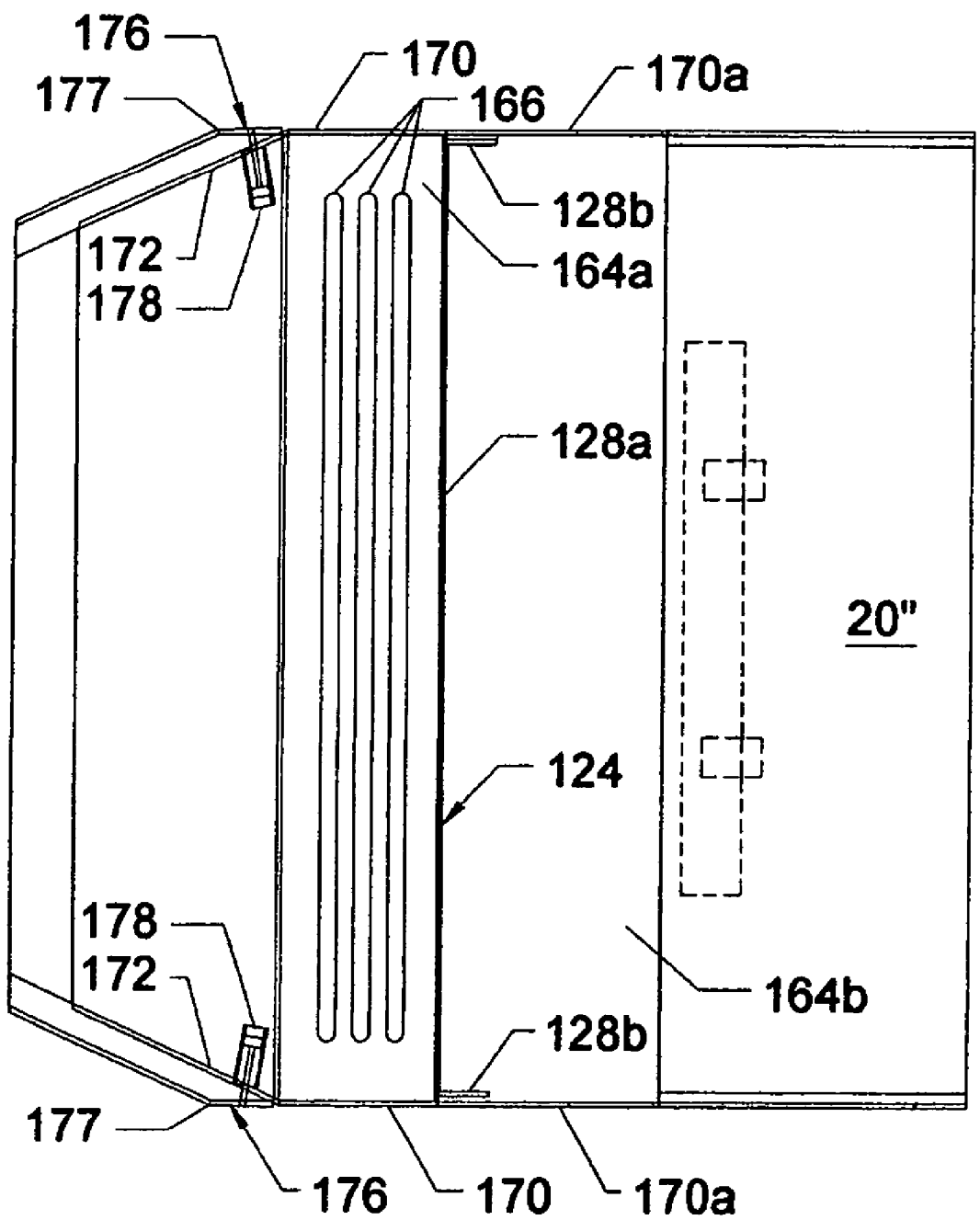
FIG. 12B is a top view of the apparatus of FIG. 12A with the wing plates in the retracted position.
Figure 12C:
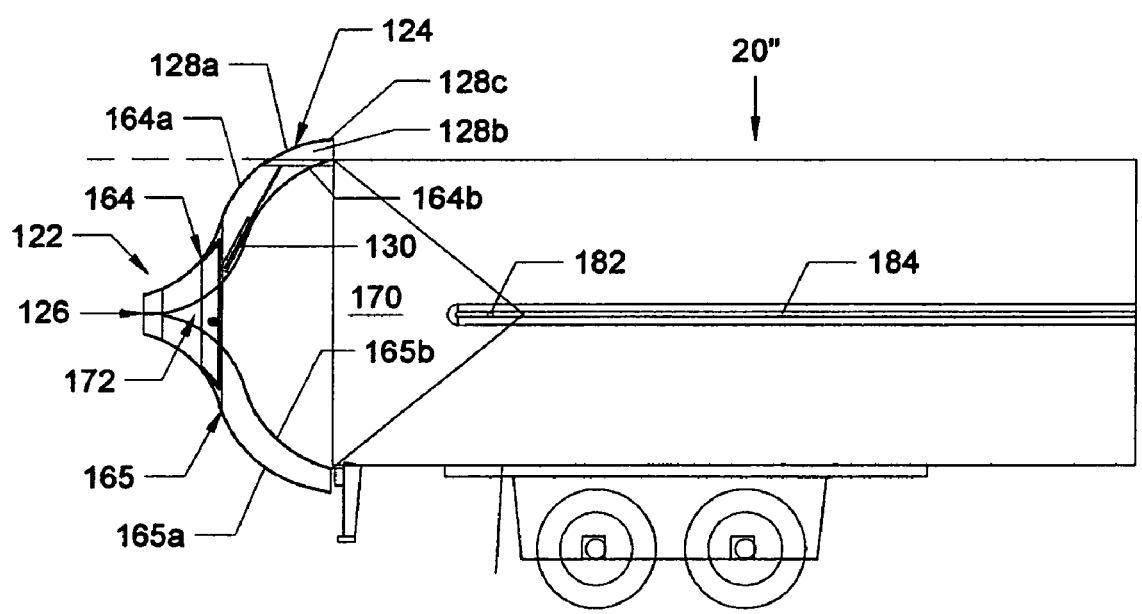
FIG. 12C is side view of an alternate drag reducing apparatus on a trailer of a truck in an extended position.
Figure 12D:
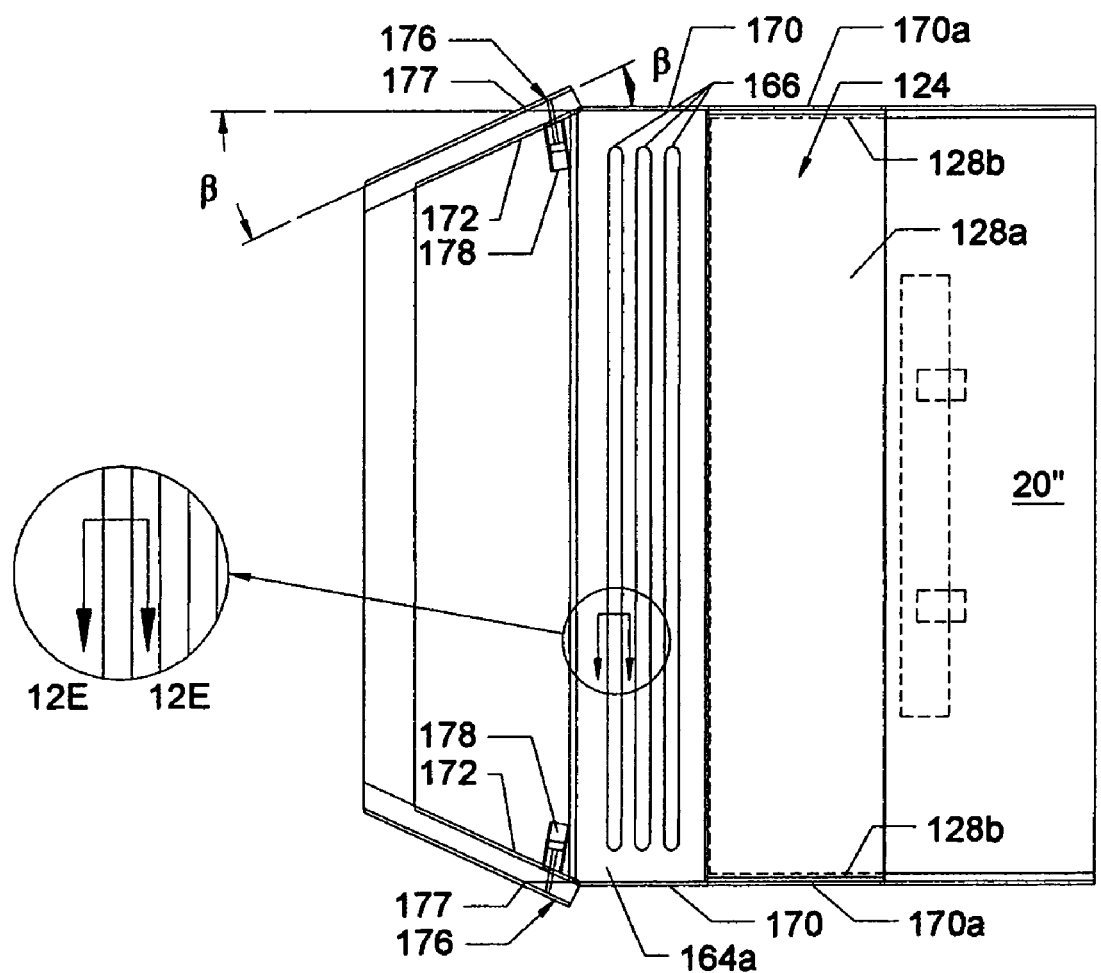
FIG. 12D is a top view of the apparatus of FIG. 12B with the wing plates in the extended position.

FIGS. 12A-12I show an alternate drag reducing apparatus 122 for a vehicle, shown, for example, in use on a truck 20. As shown in FIG. 12A, the drag reducing apparatus 122 is formed of two portions, a head portion 124 and a body portion 126. The head portion 124 is movable with respect to the body portion 126, between a retracted position, as shown in FIGS. 12A and 12B, and an extended position, as shown in FIGS. 12C and 12D, when drag reduction is desired. The retracted and extended positions of the head portion 124 correspond to the extended and retracted positions for the entire drag reducing apparatus 122.

When in the retracted position, the head portion 124 is typically within the body portion 126, below the top height of the truck 20 (shown in broken lines in FIGS. 12A and 12C), and when in the extended position, the head portion 124 is aligned with the body portion 126, and typically flush with the curvature of the body portion 126. Although only one side of the trailer 20" with the apparatus 122 is shown in FIGS. 12A, 12C and 12F-12I, the other side is symmetric and identical, whereby the following description applies to both sides of the trailer 20" and the apparatus 122.

The head portion 124 is typically curved, and "U" shaped in cross section. The head portion 124 is formed of by a central 128a and lateral portions 128b. When in the extended position, the head portion 124 extends over the lower sheet 164b (this sheet 164b extending beyond the upper sheet 164a to the trailer 20" or proximate thereto), forming a with a gap, typically rectangular in cross-section, for air ingress. The head portion 124, when in the extended position, completes the curvature of the sheets 164a of the first member 164 of the body portion 126, as the central portion 128a is flush with the upper sheets 164a, of the body portion 126.

The lateral portions 128b of the head portion 124 are bounded by the edges 170a of the front plates 170 (the front plates 170 extending beyond the lower sheet 164b in the area where the lower sheet 164b extends beyond the upper sheet 164a), as shown in FIGS. 12B and 12D. The head portion 124 is, for example, joined to the body portion 126 by pistons 130 or other suitable driving mechanisms, with motors 114 (FIG. 11), that attach to the head portion 124, typically at the inner sides of the lateral portions 128b. The motors 114 control the movement of the pistons 130, and are linked to the master controller (MC) 24' (by wired or wireless links, or combinations thereof), for moving the head portion 124 between the extended and retracted positions.

The head portion 124 is made of a sheet, for example, of metal, plastic or the like. The head portion 124 is typically closed, but the central portion 128a may include openings, similar to the openings detailed below for the sheets 164a, 164b, 165a, 165b.

The body portion 126 includes paired sheets 164a, 164b, 165a, 165b. The paired sheets 164a, 164b, 165a, 165b are typically "S" or serpentine shaped, similar in shape to those detailed in FIGS. 7A and 7B above. The first pair 164 (first sheet member) of sheets 164a, 164b is typically oriented as the upper pair, and is designed to align with the head portion 124, while the second pair 165 (second sheet member) of sheets 165a, 165b, is typically oriented as the lower pair.

The sheets 164a, 164b, 165a, 165b are typically formed of metal, plastic or the like, and are typically of similar configurations to each other, typically paralleling each other. The sheets 164a, 164b, 165a, 165b typically include plural openings 166, such as slots or apertures, as shown in FIGS. 12B and 12D. The slots and apertures are typically arranged in patterns, but can be arranged randomly. Also, the slots and apertures may be on any combination of the sheets 164a, 164b, 165a, 165b, and on one or both sheet members 164, 165. Typically, slots or apertures are positioned on the outer sheets 164a, 165a of the first 164 and second 165 members respectively.

Figure 12E:
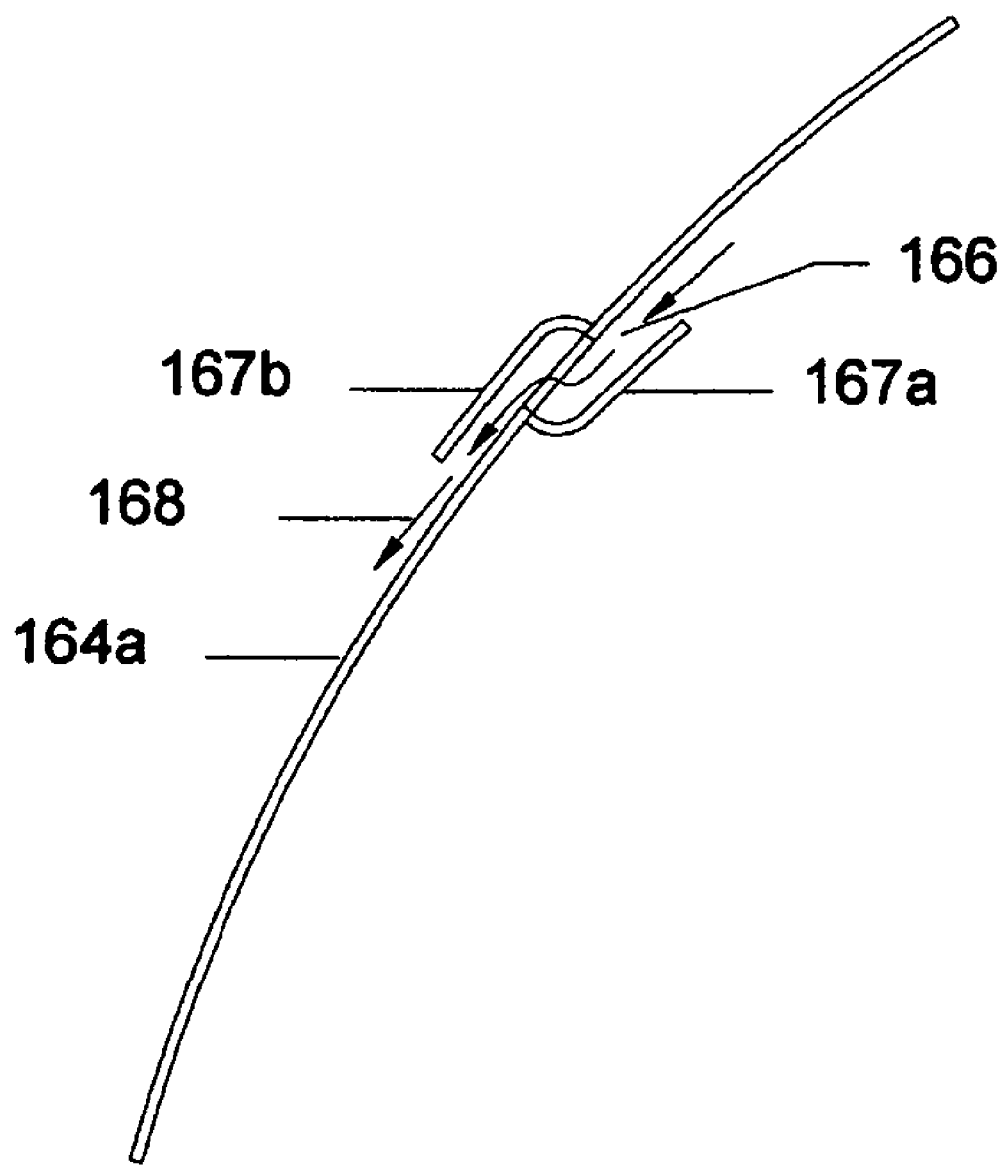
FIG. 12E is a side cross sectional view of an opening taken along line 12E-12E of FIG. 12D.

The openings 166, typically include rectangular slots, but can also include apertures, both the slots and apertures in shapes such as rectangular, polygonal, circular or rounded, triangular, or combinations thereof. The slots and apertures, or combinations thereof, are typically in patterns, but may be random. The slots or apertures may also be combined with inner 167a and outer 167b flanges, as shown in FIG. 12E, either integral with the sheet or attached thereto by conventional fastening techniques. These inner 167a and outer 167b flanges enhance the air flow, shown by the arrows 168. The inner flanges 167a may also be movable to close the openings under the control of the master controller (MC) 24'. The sheets 164a, 164b and 165a and 165b are typically joined by conventional fastening techniques.

There may also be a moveable cover sheet (not shown), to cover the slots and apertures when desired. This cover sheet may be a rollup sheet, at the junction of the members 164, 165, under the control of the master controller (MC) 24'. It may also be manually controlled by the driver or remote operator. The slots or apertures may be covered or uncovered periodically, or moved between covered and uncovered at intervals (regular and staggered), that are typically programmed into the master controller (MC) 24'.

First or front plates 170 and second or rear plates 172, these rear plates 172 are tapered inward from the point of attachment to the respective front plates 170, join to the sheets 164a, 164b of the first pair 164, and the sheets 165a, 165b, of the second pair 165. The joining is by conventional fastening techniques, such as welds, adhesives, mechanical fasteners and the like. The fastening is such that there is a gap between each pair of sheets 164a, 164b and 165a, 165b, for airflow therethrough, to facilitate drag reduction.

Wing plates 176 are positioned laterally on the respective rear or second plates 172. These wing plates 176 are movable from a retracted position, shown in FIG. 12B, to an extended position, shown in FIG. 12D, when drag reduction is desired. The retracted and extended positions of the head portion 124 correspond to the extended and retracted positions for the entire drag reducing apparatus 122.

In the extended position, the wing plates 176 extend beyond the width of the tractor 20", at an angle β, that may be, for example, approximately 25°. The wing plates 176 are typically hinged to the second or rear plates 172 and mounted by hinges 177 and moved by pistons 178 or the like, controlled by the master controller (MC) 24'.

The head portion 124 is typically coordinated with the wing plates 176, via the master controller (MC) 24'. Accordingly, when the drag reducing apparatus 122 is in the retracted position (FIGS. 12A and 12B), the head portion 124 is within the body portion 126, typically below the height of the trailer 20" (illustrated by the broken line in FIG. 12A), and the wing plates 176 are against the second or rear plates 172 and within the width of the tractor 20". Similarly, when the drag reducing apparatus 122 is in the extended position (FIGS. 12C and 12D), the head portion 124 is extended from and outside the body portion 126 (at least a portion thereof), for example, the edge 128c of the central portion 128a is above the height of the trailer 20" (as shown in FIG. 12C), and the wing plates 176 are beyond the width of the tractor 20".

The wing plates 176 may also be subjected to a secondary adjustment, once moved to the extended position. For example, if one of the obstacles programmed into the GPS unit (G) 25 and master controller (MC) 24' is wind speed and wind direction, the wing plate 176 on the non-windy side of the trailer 20" may remain open (in the extended position), while the wing plate 176 on the windy side of the trailer 20" may be moved inward toward the rear plate 172, partially or fully (to the retracted position), depending on the programming of the master controller (MC) 24' for the various wind speeds.

The drag reducing apparatus 122 is movable between operative or active positions (shown in FIGS. 12A-12E and detailed above), when the truck 20 is moving or going to be moving, and storage positions, FIGS. 12F-12I (with FIG. 12F being a transitional position, between the operative or active positions and the storage position), when the truck 20 is parked (or otherwise stopped), to which attention is now directed.

The first or front plates 170, typically include with bars 182 that are received in slots 184 on the sides of the trailer 20" of the truck 20. The bars 182 are on a drive mechanism (gear and chain under the control of a driver, not shown), the drive mechanism represented in the system 110 as element 116, controlled by the master controller (MC) 24', as shown in FIG. 11. The drive mechanism is also controllable through the manual controller 27', as also shown in FIG. 11. The drive mechanism may be manual, such that the apparatus 122 can be moved into and out of the storage position manually (in accordance with the process and drawing figures detailed below).

Figure 12F:
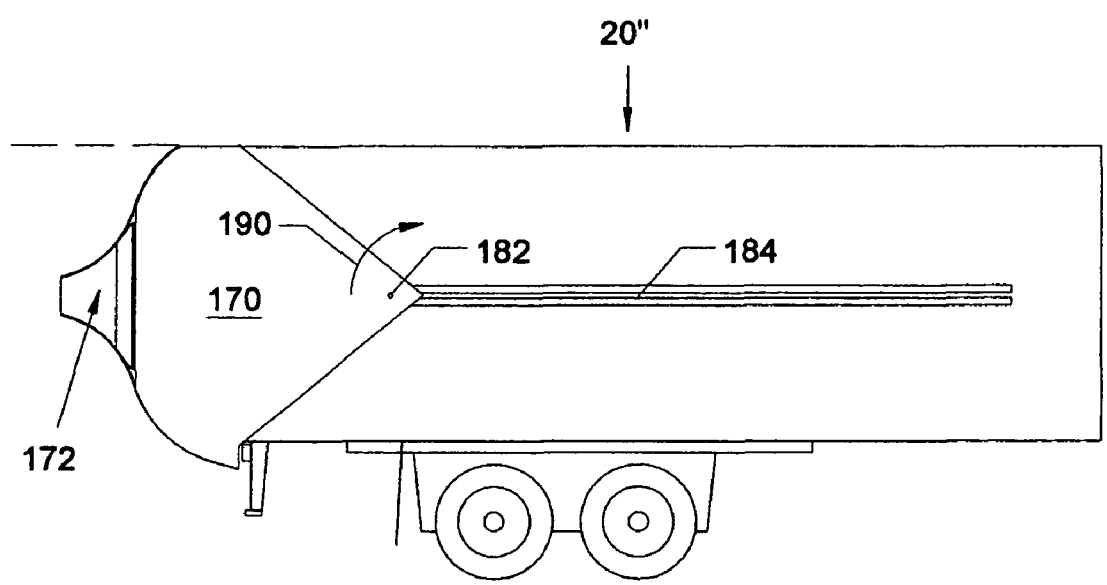
FIGS. 12F-12I are side views of the a drag reducing apparatus of FIG. 12A being moved from an operative or active position to an inactive or storage position.

As shown in FIG. 12F, the drag reducing apparatus 122 is in an operative but transitional position, as the head portion 124 and wing plates 176 are in their retracted positions, and the drag reducing apparatus 122 has been activated to be moved to the storage position by the plates 170 being rotated (for example, clockwise) in the direction of the arrow 190.

Figure 12G:
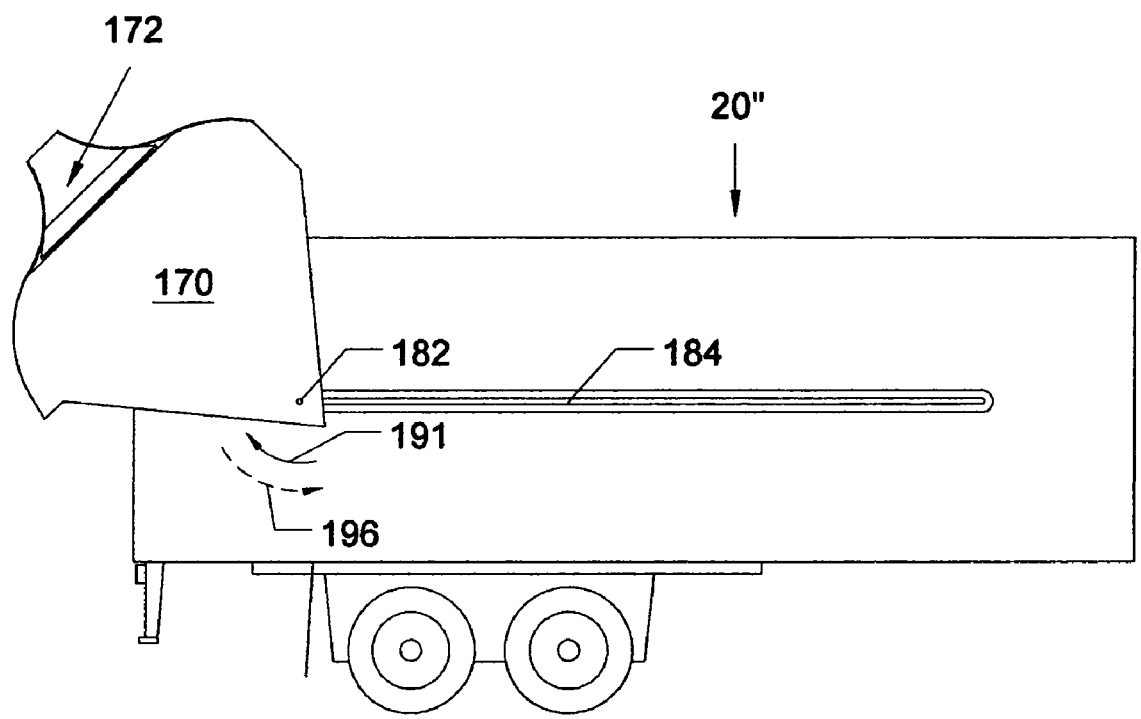
Figure 12H:
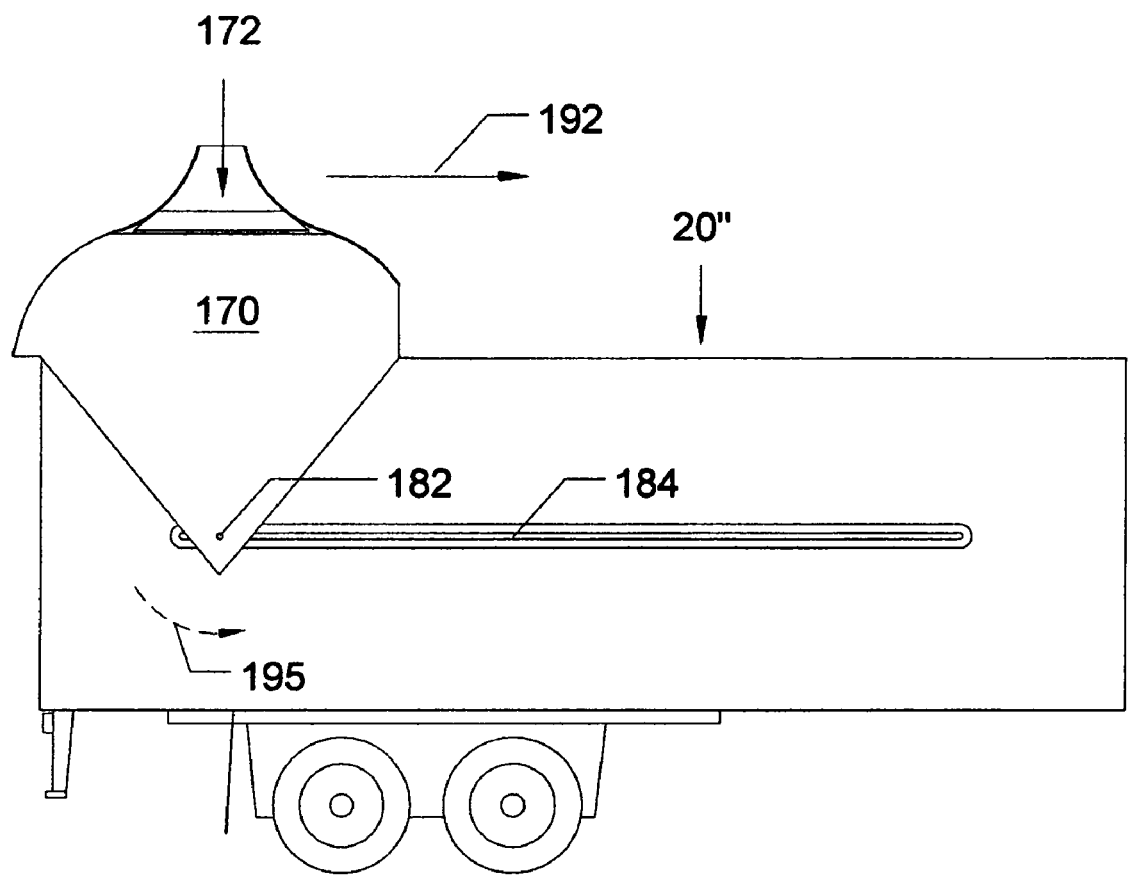
Figure 12I:
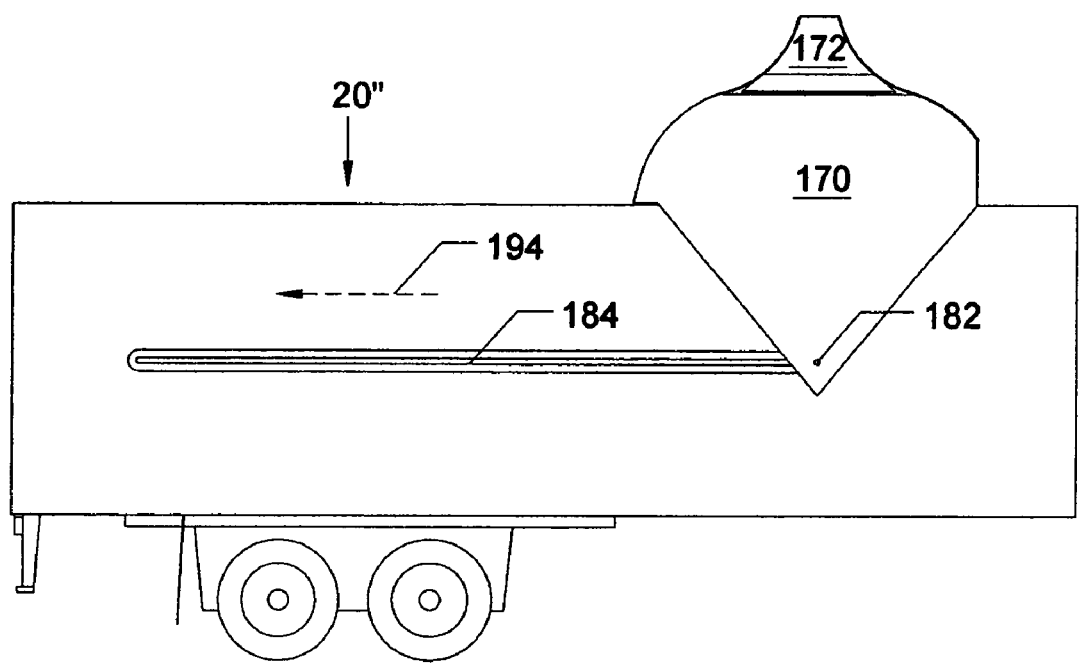

Movement to the storage position continues, as the first or front plates 170 are moved, typically under control of the master controller (MC) 24' (as activated by the manual controller 27') upward, or in a clockwise rotation (as per the arrow 191), and shown in FIG. 12G, to a predetermined point, typically above the trailer 20", as shown in FIG. 12H. The apparatus 122 is then moved along the slots 184 (by the chain drive being activated), as per the arrow 192, as shown in FIG. 12H. As shown in FIG. 12I, the apparatus 122 is now in the storage or inoperative position.

Should movement to the operative position be desired, the opposite of the above procedure is performed. The opposite direction is indicated by arrows 194 in FIG. 12I, 195, in FIG. 12H, and 196 in FIG. 12G, ultimately ending in the transitional position of FIG. 12F, where the active or operative positions may be resumed.

Figure 13A:
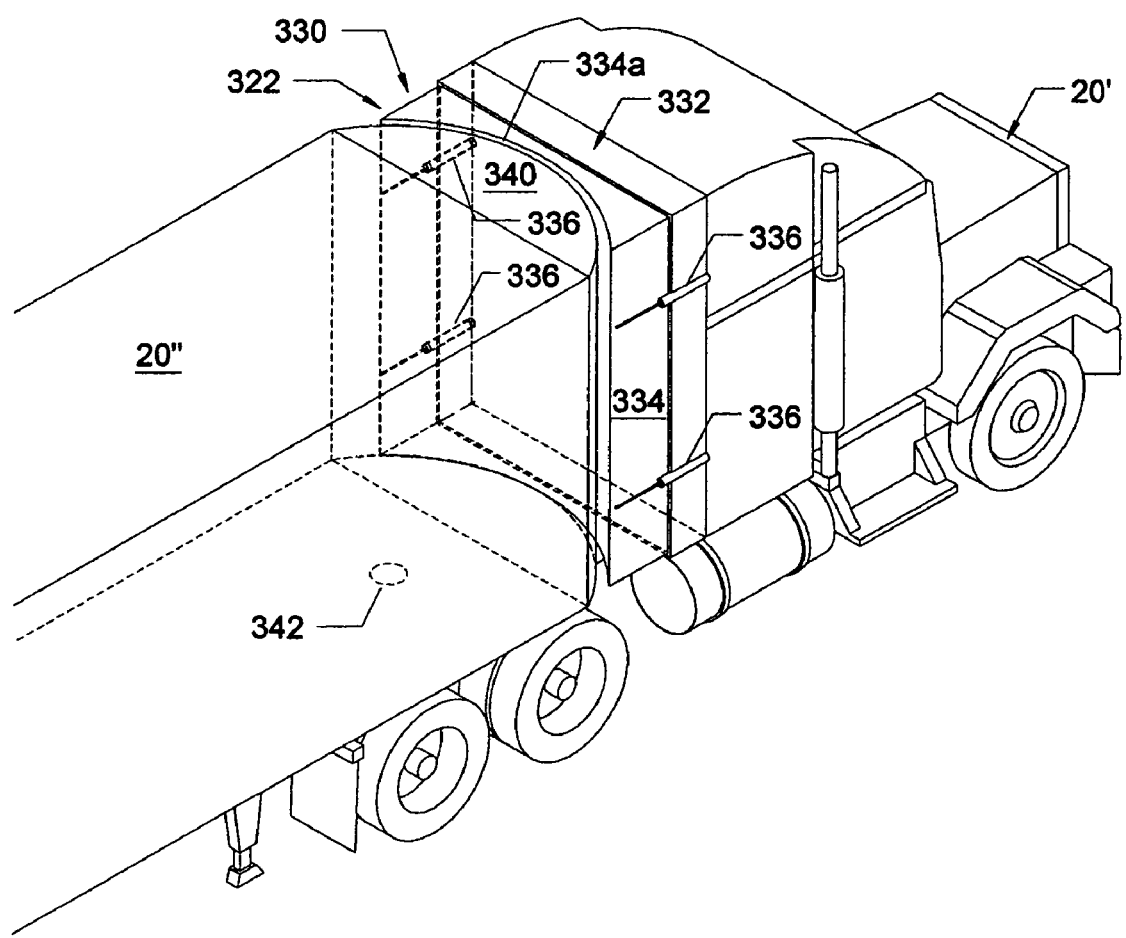
FIG. 13A is a perspective view of a drag reducing apparatus in an extended position at the front end of a truck that is part of the alternate drag reducing system of FIG. 11.
Figure 13B:
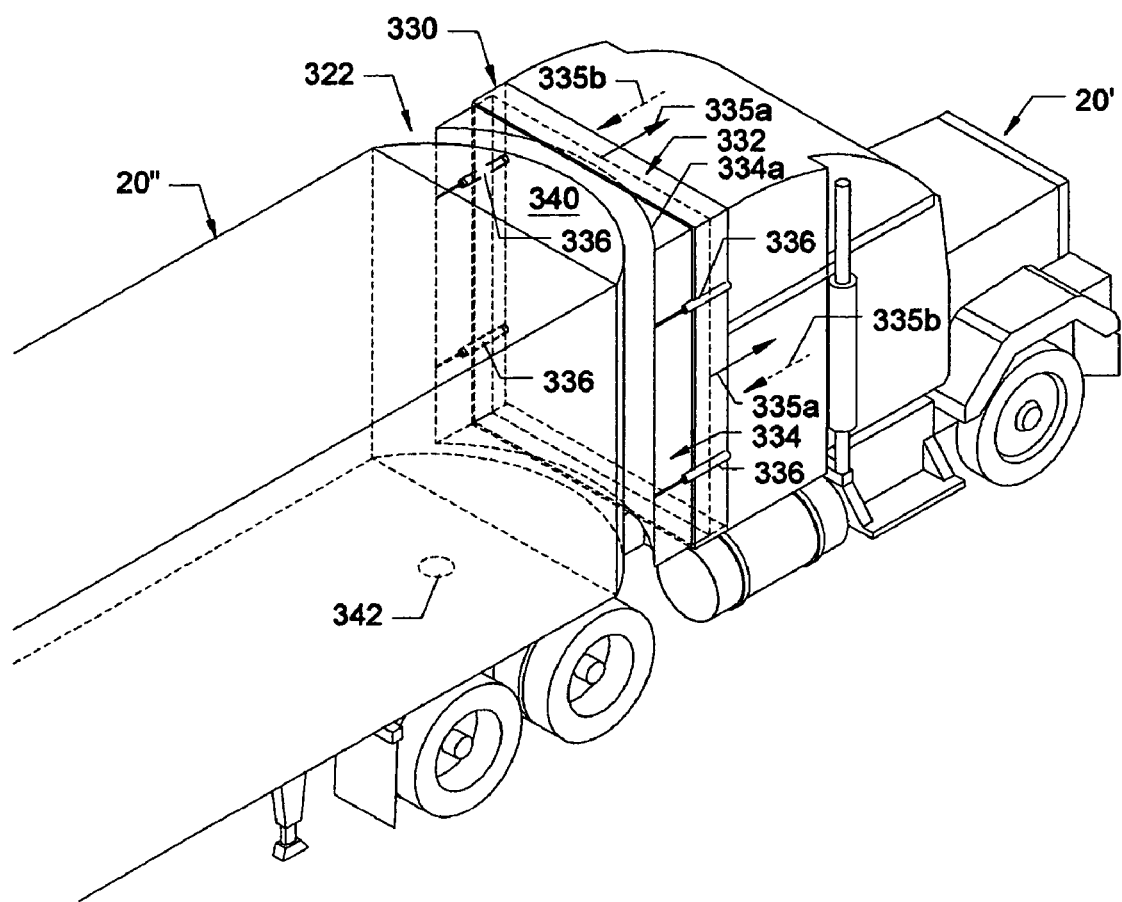
FIG. 13B is a perspective view of the drag reducing apparatus of FIG. 13A in a partially extended position.
Figure 13C:
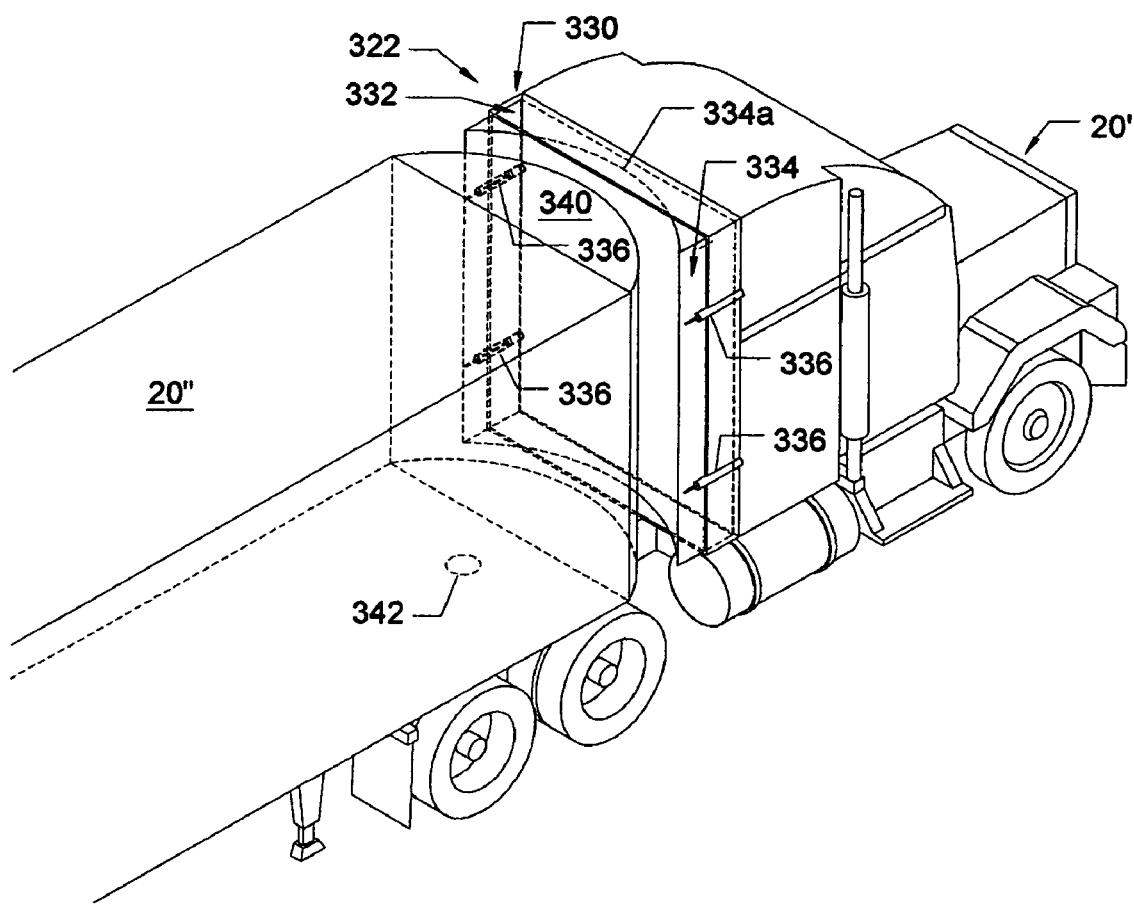
FIG. 13C is a perspective view of the drag reducing apparatus of FIG. 13A in a retracted position.

FIGS. 13A-13C show another drag reducing apparatus 322, for use at the front of the truck 20, partially on the trailer 20' and partially on the tractor 20", and controlled by the master controller (MC) 24'. The drag reducing apparatus 322 is movable between extended positions, when drag reduction is desired, for example, on highways and other open roads, and a retracted position, when drag reduction is limited, due to the nature of the road, small road, open road with obstacles, or city or suburban street, or parking.

This drag reducing apparatus 322 includes a skirt unit 330, typically a fixed skirt 332, that receives and houses or covers (fully or partially) a movable skirt 334, inside of it, in a telescoping manner. The movable skirt 334 typically includes a cut-out section 334a, typically in an arc or rounded configuration, for example, partially cylindrical shaped. The movable skirt 334 is moved inward (as per the arrow 335a) and outward (as per the arrow 335b) to/from the fixed skirt 332 by pistons 336, or other motors or the like, as controlled by the master controller (MC) 24'. The extent of the movement of the movable skirt 334 (to various distances outside of the fixed skirt 332, typically to a point tangential to the arc of the cut-out section 334a), depends on the amount of drag reduction desired.

For example, when maximum drag reduction is desired, the movable skirt 334 is in its fully extended position, as shown in FIG. 13A. This extended position corresponds to the extended position of the drag reducing apparatus 122 detailed above. Also, for example, when intermediate drag reduction is desired, the movable skirt is moved to a partially extended position, typically approximately half way out of the fixed skirt 332, as shown in FIG. 13B. This partially extended position corresponds to the extended position for the drag reducing apparatus 122 detailed above, as adjusted by the master controller (MC) 24', based on the speed of the truck 20, as well as the type of road curvature, as programmed into the GPS unit (G) 25 and the master controller (MC) 25'. If the speed of the truck and/or road curvature is within predetermined ranges, where the partially extended position is the proper position for the movable skirt 334, the master controller (MC) 24' will signal the movement mechanism to move the movable skirt 334 to this partially extended position.

As shown in FIG. 13C, when drag reduction is not possible, the movable skirt 334 is within the fixed skirt 332, in a retracted position. This retracted position corresponds to the retracted position for the drag reducing apparatus 122, detailed above.

A cap member 340, corresponding to the arc of the cut-out section 334a, and for, example, typically of a radius of curvature, corresponding to the fifth wheel 342 (the point of attachment for the trailer 20" to the tractor 20' of the truck 20) of the truck 20. Alternately, the cap member 340 may be on the tractor 20', with the skirt member 330 on the trailer 20". Also, alternately, the cap member 340 need not be present, whereby the cut-out portion 334a of the movable skirt 334 would not be present.

The fixed skirt 332 and movable skirt 324, are for example, mounted on the tractor 20' of the truck 20 and, with the movable skirt 334 attached to motor mechanisms (not shown), controlled by the master controller (MC) 24. The fixed skirt 332 and movable skirt 334, as well as the cap member 340 are typically unitary members. These skirts 332, 334 and the cap member 340 are typically made of rubber, plastic or the like. The cap member 340 may be fitted onto the trailer 20" by either a friction fit and/or conventional mechanical fasteners.

Although shown as a single piece, that is moved inward and outward by motor mechanisms, the movable skirt 334 may be folded in an accordion like manner, for moving between the retracted and extended positions. This accordion like skirt is typically a unitary member, but may be in pieces, joined together by conventional fastening techniques. Alternately, the positions of the fixed skirt 332 and movable skirt 334 can be reversed, such that the movable skirt 334 rides over the fixed skirt 332.

Figure 13D:
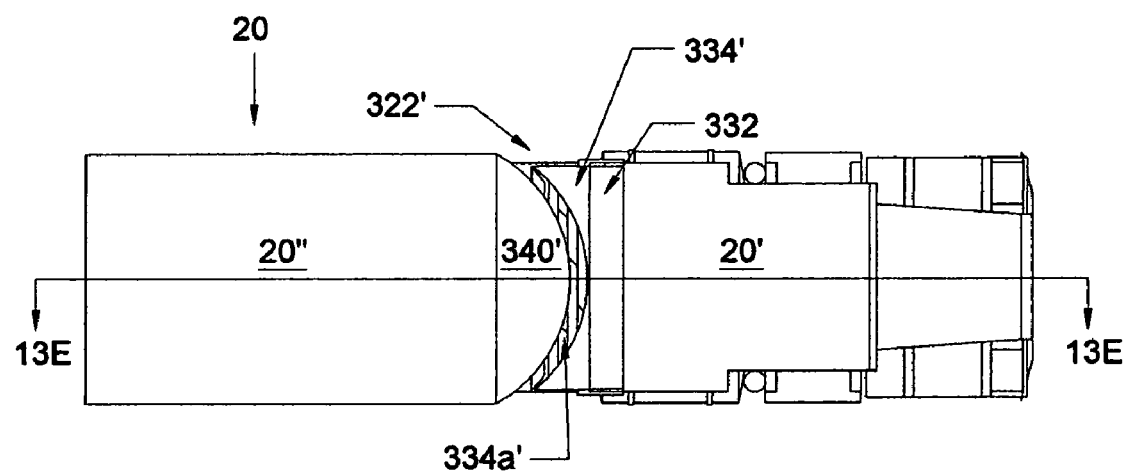
FIG. 13D is a top view of another drag reducing apparatus in an extended position at the front end of a truck that is part of the alternate drag reducing system of FIG. 11.
Figure 13E:
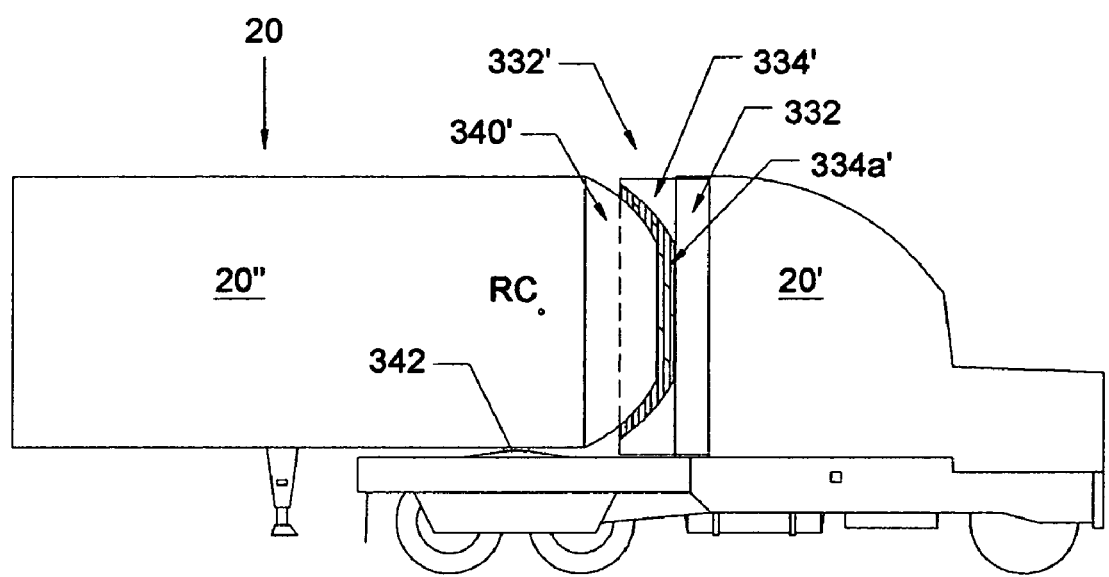
FIG. 13E is a cross sectional view of FIG. 13D taken along line 13E-13E.
Figure 13F:
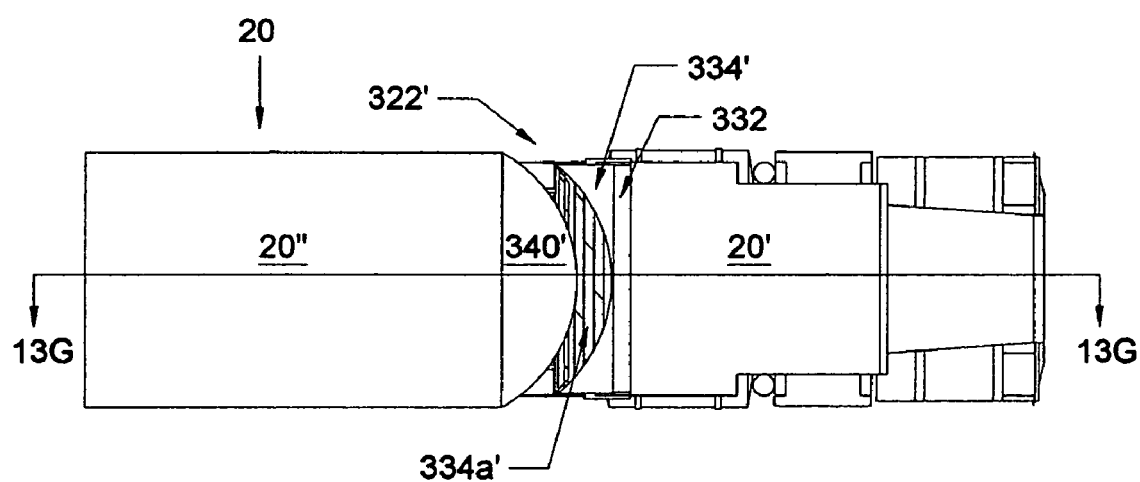
FIG. 13F is a top view of the drag reducing apparatus of FIGS. 13D and 13E in a partially extended position.
Figure 13G:
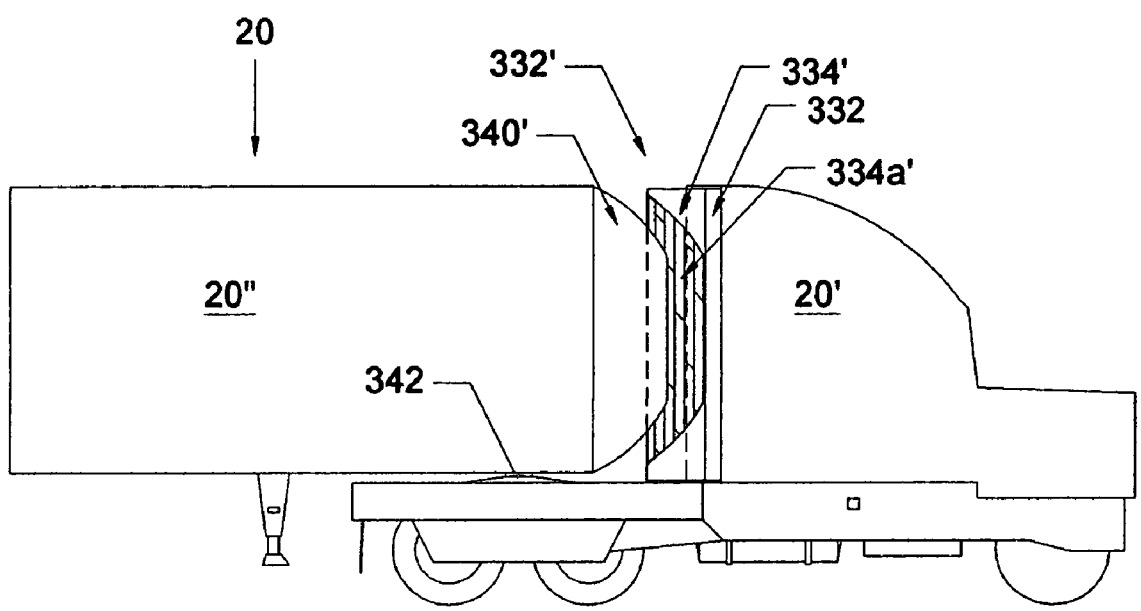
FIG. 13G is a cross sectional view of FIG. 13F taken along line 13G-13G.
Figure 13H:
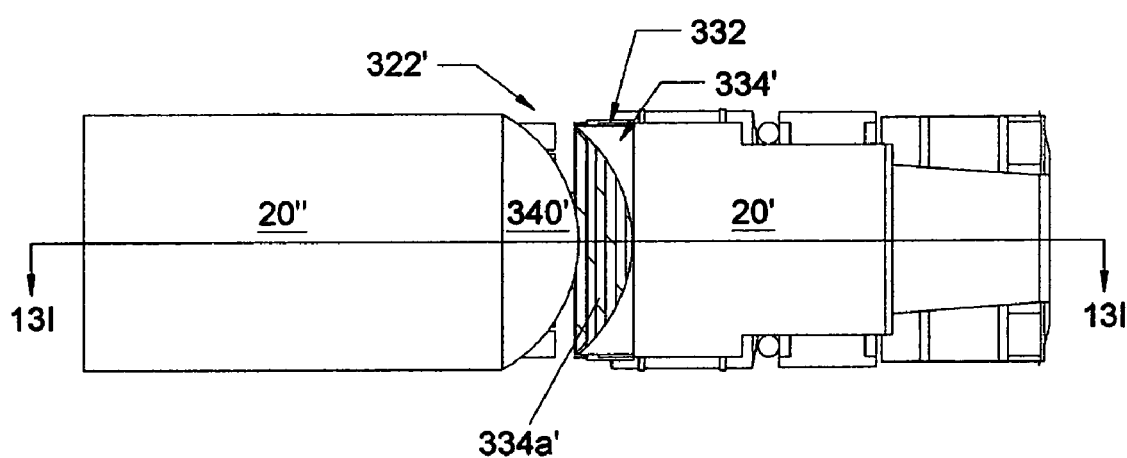
FIG. 13H is a top view of the drag reducing apparatus of FIGS. 13D and 13E in a retracted position.
Figure 13I:
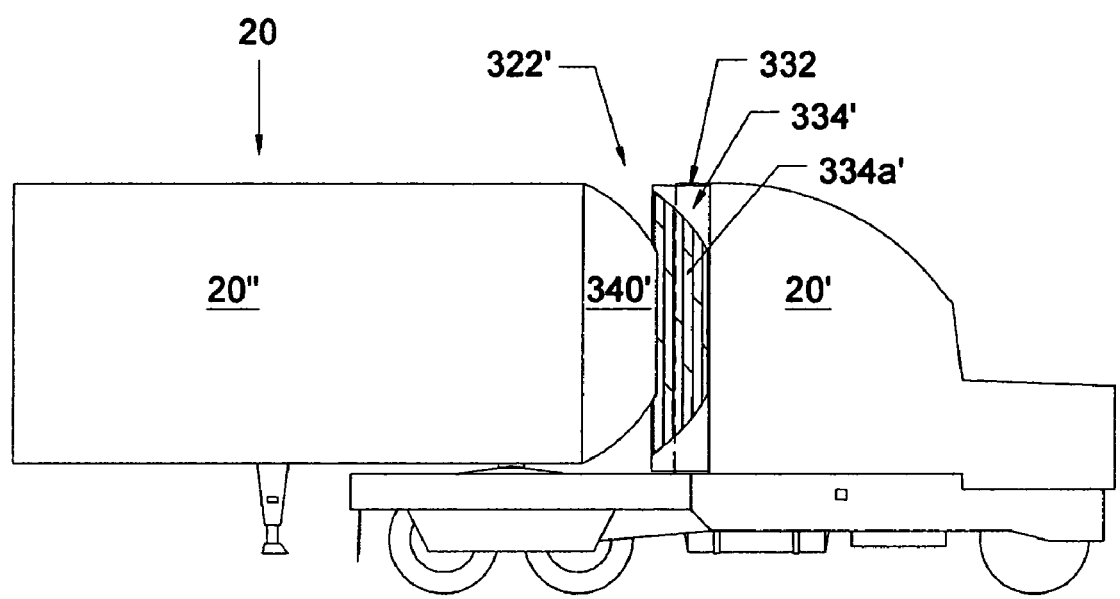
FIG. 13I is a cross sectional view of FIG. 13H taken along line 13I-13I.

An alternate drag reducing apparatus 322', similar to drag reducing apparatus 322 is shown in FIGS. 13D-13I. Similar components bear the same numbers and have been discussed above, while different components are described below. This alternate drag reducing apparatus 322' operates similar to the drag reducing apparatus 322, detailed above. FIGS. 13D and 13E show the apparatus 322' in a fully extended position, while FIGS. 13F and 13G show the apparatus 322' in a partially extended position. FIGS. 13H and 13I shows the apparatus 322' in a retracted position.

In the apparatus 322' the cap member 340' is a truncated partial sphere, whose radius of curvature, from the point RC in FIG. 13E, is based on the location of the fifth wheel 342. The movable skirt 334' has a cut out section 334a' or inner portion that is partially spherical, and typically includes a truncation, to correspond to the shape of the cap member 340'.

Figure 14A:
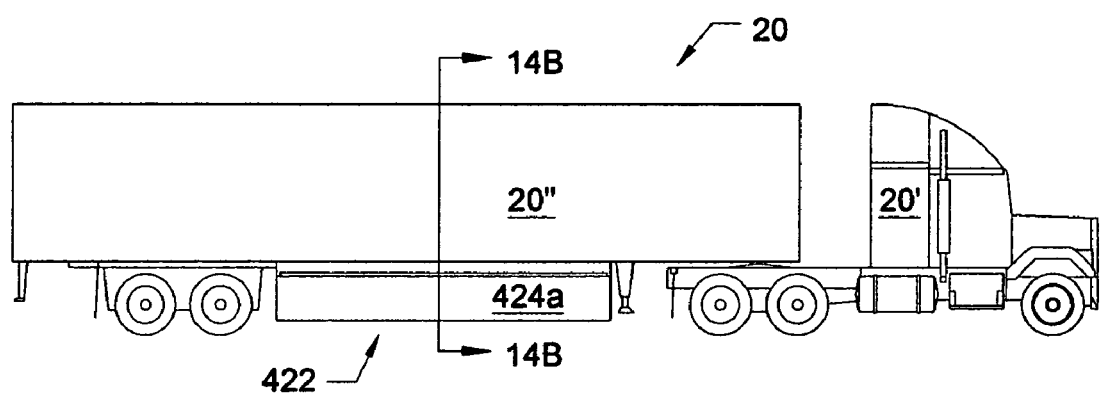
FIG. 14A is a side view of a drag reducing apparatus in an extended position along the tractor of a truck that is part of the alternate drag reducing system of FIG. 11.
Figure 14B:
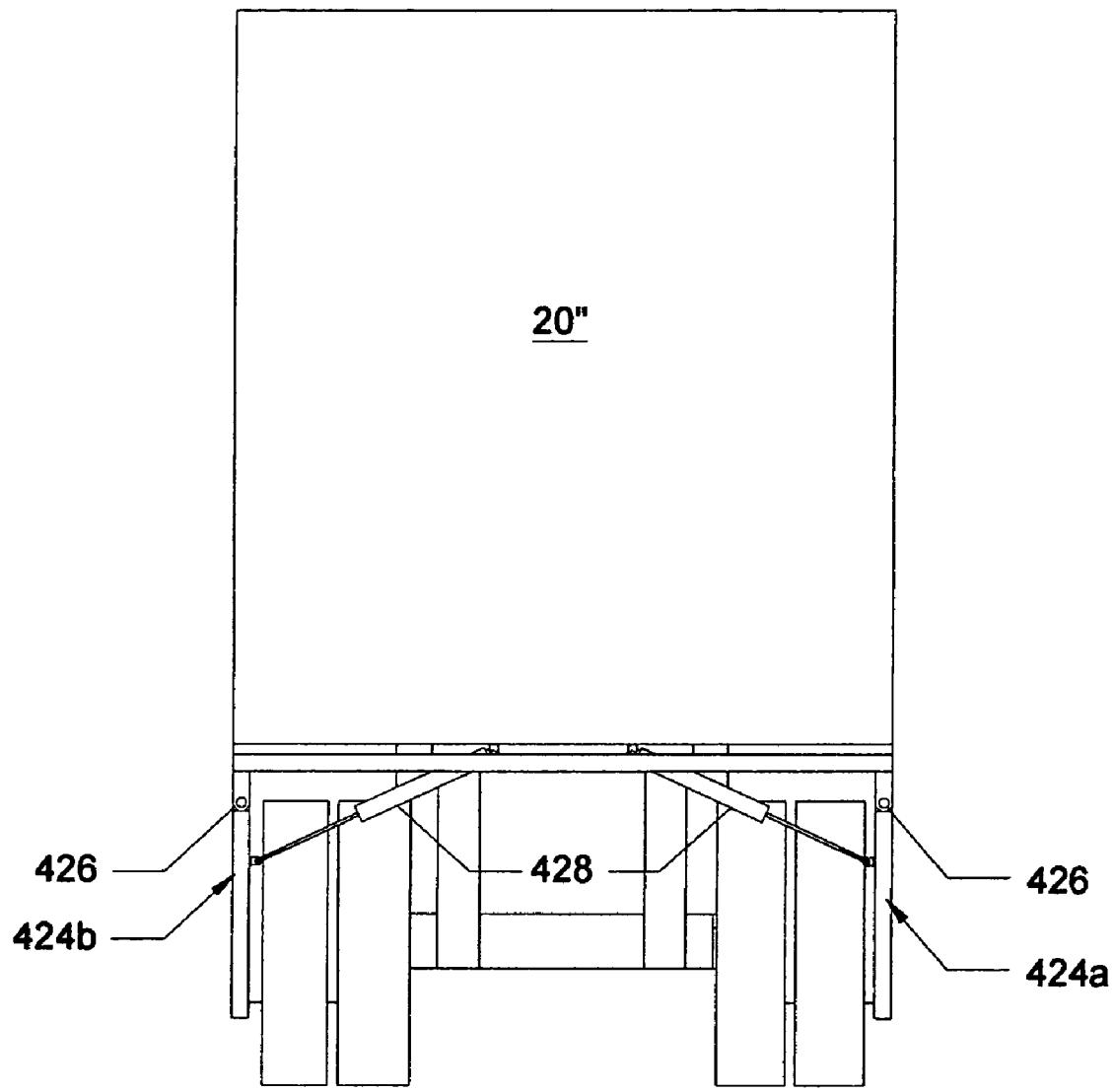
FIG. 14B is a rear cross-sectional view of the drag reducing apparatus of FIG. 14A, taken along line 14B-14B.
Figure 14C:
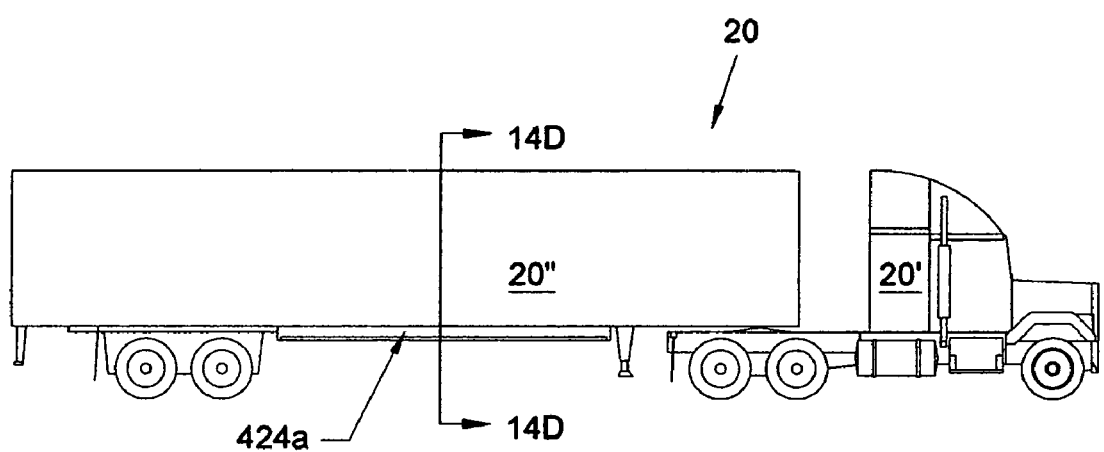
FIG. 14C is a side view of a drag reducing apparatus of FIG. 14A in a retracted position; and, FIG. 14D is a rear cross-sectional view of the drag reducing apparatus of FIG. 14C, taken along line 14D-14D.
Figure 14D:
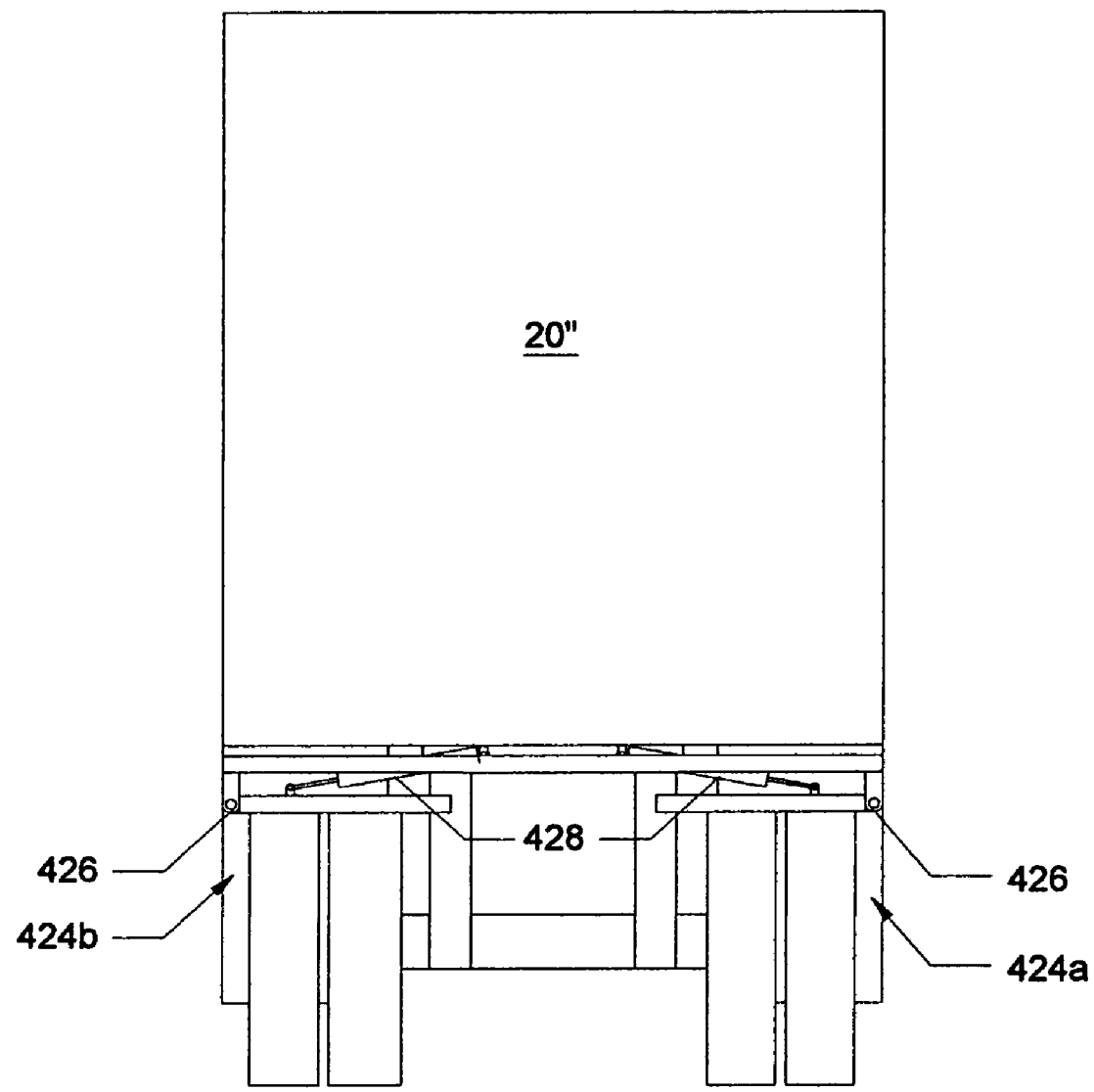

FIGS. 14A-14D show another drag reducing apparatus 422, for use at the sides of the trailer 20" of the truck 20. The drag reducing apparatus 422 is movable between an extended position, shown in FIGS. 14A and 14B, when drag reduction is desired, for example, on highways and other open roads, and a retracted position, as shown in FIGS. 14C and 14D, when drag reduction is limited, due to the nature of the road, small road, open road with obstacles, or city or suburban street, or parking. The extended and retracted positions for the drag reducing apparatus 422, correspond to the extended and retracted positions for the drag reducing apparatus 122 detailed above. The adjustment in the extended position to a partially extended position performed, of the movable skirt 334 is controlled by the master controller (MC) 24', depending on factors such as, the road curvature and road type, and speed of the vehicle, as programmed into or determined or obtained by either the master controller (MC) 24' or the GPS unit (G) 25.

The drag reducing apparatus 422, includes panels 424a, 424b, made of metal, plastic, or the like, and movably mounted, for example, by hinges 426 to the sides of the trailer 20". These panels 424a, 424b are each moved between the extended (shown in FIGS. 14A and 14B as flush with the sides of the trailer 20") and retracted positions by pistons 428 or other similar mechanisms. These extended positions may be such that the panels 424a, 424b extend beyond the width of the trailer 20". The pistons 428 and their movement to control movement of the panels 424a, 424b are controlled by the master controller (MC) 24'.

In operation of the system 110, for example, the operator, via the manual override of the manual controller 27' selects the drag reducing apparatus 122, 322 or 322', 422 that are active. The default setting is that all drag reducing apparatus 122, 322 or 322', 422 are activated, if the manual override of the manual controller 27' has not been accessed to deactivate one or more drag reducing apparatus 122, 322 or 322', 422. Also, as stated above, all drag reducing apparatus 122, 322 or 322', 422 are movable between extended positions, when drag reduction is desired, and retracted positions, when drag reduction is not feasible, due to the presence of obstacles.

In this example operation, all drag reducing apparatus 122, 322 or 322', and 422 are active and operable and operate similarly to drag reducing apparatus 22, detailed above. As detailed above, the system 110 is operable in one or more of the three exemplary operative modes detailed above, with the height adjustment mechanism 23, replaced by piston motors 114, 115, skirt movement mechanism 117 and panel movement mechanism 118. This allows the master controller (MC) 24' to signal the piston motors 114, 115, skirt movement mechanism 117, and panel movement mechanism 118, to move all three drag reducing apparatus 122, 322 or 322', and 422, typically in simultaneous or contemporaneous in time, between their retracted (FIGS. 12A, 12B, 13C or 13H, 13I, 14C and 14D), and extended positions (FIGS. 12C, 12D, 13A, 13B or 13D-13G, 14A and 14B), for drag reduction in their associated vehicles, such as the truck 20. It should also be noted, that when the extended position of the skirted drag reducing apparatus 322 or 322' is desired, the extent of skirt extension is determined based on factors such as truck speed and the requisite obstacles being approached or traveled on, as detailed above.

There have been shown and described preferred embodiments of a drag reducing system, and drag reducing apparatus, for vehicles. It is apparent to those skilled in the art, however, that many changes, variations, modifications, and other uses and applications for the apparatus and its components are possible, and also such changes, variations, modifications, and other uses and applications which do not depart from the spirit and scope of the disclosed subject matter are deemed to be covered by the invention, which is limited only by the claims which follow.

What is claimed is:

1. A vehicle drag reduction system comprising;
   at least one drag reducing apparatus for placement on a vehicle having a height, the at least one drag reducing apparatus for moving between a first position, where the at least one drag reducing apparatus is in an extended position above the height of the vehicle, and a second position, where the at least one drag reducing apparatus is in a retracted position below the height of the at least one drag reducing apparatus in the first position;
   a mechanism in communication with the at least one drag reducing apparatus for moving the at least one drag reducing apparatus between the first position and the second position;
   a navigation management system for providing the location of the vehicle and the location of overhead obstacles along the path of the vehicle; and,
   a processor, electronically coupled to the navigation management system, the processor programmed to:
   analyze the location of the vehicle with respect to location of an overhead obstacle along the path of the vehicle; and,
   signal the movement mechanism for moving the at least one drag reducing apparatus between the first and second positions in accordance with the location of the vehicle with respect to the location of the overhead obstacle along the path of the vehicle.

2. The system of claim 1, wherein the navigation management system includes at least a portion of a global positioning system (GPS).

3. A drag reducing apparatus comprising:
   a first sheet including a first curved portion and a second curved portion;
   a second sheet including a first curved portion, substantially in alignment with the first curved portion of the first sheet, and a second curved portion, substantially in alignment with the second curved portion of the first sheet; and,
   the first curved portions of the first sheet and the second sheet defining a first end of the apparatus, the first end including an opening for initial air ingress for drag reduction, and the second curved portions of the first sheet and the second sheet defining a second end of the apparatus for air egress, and
   the first sheet and the second sheet arranged to define an airflow pathway between the first sheet and the second sheet for causing drag reduction.

4. The drag reducing apparatus of claim 3, wherein the first sheet is spaced apart from the second sheet at a first distance at the first and, and a second distance at the second end, the first distance greater than the second distance.

5. The apparatus of claim 3, wherein the first sheet includes openings therein.

6. The apparatus of claim 3, additionally comprising:
   at least one member for joining the first sheet to the second sheet.

7. A vehicle drag reducing system comprising:
   at least one drag reducing apparatus configured for placement on a vehicle having a height, the at least one drag reducing apparatus for moving between a first position, where the at least one drag reducing apparatus is in an extended position at least partially above the height of the vehicle, and a second position, where the at least one drag reducing apparatus is in a retracted position, below the height of the at least one drag reducing apparatus in the first position;
   a mechanism in communication with the at least one drag reducing apparatus for moving the at least one drag reducing apparatus between the first position and the second position;
   an apparatus for providing the location of the vehicle;
   at least one storage medium for storing a location of at least one overhead obstacle; and,
   a processor in electronic communication with the apparatus for providing the location of the vehicle, and in electronic communication with the at least one storage medium, the processor programmed to:
   analyze the location of the vehicle with respect to location of the at least one overhead obstacle; and,
   signal the movement mechanism for moving the at least one drag reducing apparatus between the first and second positions in accordance with the location of the vehicle with respect to the location of at least one overhead obstacle.

8. The system of claim 7, wherein the apparatus for providing the location of the vehicle includes a Global Positioning System (GPS) receiver.

9. The system of claim 8, wherein the at least one storage medium includes a database for maintaining the location of the at least one overhead obstacle.

10. The system of claim 9, wherein the processor programmed to provide the at least one signal includes the processor programmed to send at least one signal to cause the movement mechanism to move the at least one drag reducing apparatus from the first position to the second position when the vehicle is at or within a predetermined distance toward the at least one overhead obstacle.

11. The system of claim 10, wherein the processor programmed to provide the at least one signal includes the processor programmed to send at least one signal to cause the movement mechanism to move the at least one drag reducing apparatus from the second position to the first position when the vehicle is at or outside of a predetermined distance away from the at least one overhead obstacle.

12. A vehicle drag reducing system comprising:
   at least one drag reducing apparatus configured for placement on a vehicle having a height, the at least one drag reducing apparatus for moving between a first position, where the at least one drag reducing apparatus is in an extended position at least partially above the height of the vehicle, and a second position, where the at least one drag reducing apparatus is in a retracted position below the height of the at least one drag reducing apparatus in the first position;

a mechanism in communication with the at least one drag reducing apparatus for moving the at least one drag reducing apparatus between the first position and the second position;

a Global Positioning System (GPS) apparatus for providing the location of the vehicle;

at least one storage medium for storing a location of at least one overhead obstacle, and at least a first predetermined distance and a second predetermined distance; and, a processor in electronic communication with the apparatus for providing the location of the vehicle, and in electronic communication with the storage medium, the processor programmed to:

analyze the distance between the location of the vehicle and the at the location of the at least one overhead obstacle, and at least one predetermined distance; and, provide at least one signal that will cause the movement mechanism to move the at least one drag reducing apparatus between the first and second positions depending on the analyzed distance.

13. The system of claim 12, wherein the Global Positioning System (GPS) includes a Global Positioning System (GPS) receiver.

14. The system of claim 13, wherein the at least one storage medium includes a database for maintaining the location of the at least one overhead obstacle and a database for maintaining the first predetermined distance and the second predetermined distance.

15. The system of claim 14, wherein the processor programmed to analyze the distance between the location of the vehicle and the at the location of the at least one overhead obstacle, and at least one predetermined distance, includes the processor being programmed to compare the distance between the location of the vehicle and the location of the at least one overhead obstacle and at least one predetermined distance.

16. The system of claim 15, wherein the processor programmed to provide the at least one signal includes the processor programmed to send at least one signal to cause the movement mechanism to move the at least one drag reducing apparatus from the first position to the second position when the vehicle is at or within the first one predetermined distance.

17. The system of claim 15, wherein the processor programmed to provide the at least one signal includes the processor programmed to send at least one signal to cause the movement mechanism to move the at least one drag reducing apparatus from the second position to the first position when the vehicle is at or outside of the second predetermined distance.

18. A method for controlling vehicle drag comprising:
providing at least one drag reducing apparatus on a vehicle, the vehicle having a height, the at least one drag reducing apparatus for moving between a first position, where the at least one drag reducing apparatus is in an extended position at least partially above the height of the vehicle, and a second position, where the at least one drag reducing apparatus is in a retracted position below the height of the at least one drag reducing apparatus in the first position;

maintaining at least one database for storing a location of at least one overhead obstacle;

obtaining the location of the vehicle;

analyzing the location of the vehicle with respect to the location of the at least one overhead obstacle; and, moving the at least one drag reducing apparatus between the first and second positions in accordance with the location of the vehicle with respect to the location of at least one overhead obstacle.

19. The method of claim 18, wherein obtaining the location of the vehicle is by Global Positioning System (GPS) technology.

20. The method of claim 19, wherein moving the at least one drag reducing apparatus includes moving the at least one drag reducing apparatus from the first position to the second position when the vehicle is at or within a predetermined distance toward the at least one overhead obstacle.

21. The method of claim 20, wherein moving the at least one drag reducing apparatus includes moving the at least one drag reducing apparatus from the second position to the first position when the vehicle is at or outside of a predetermined distance away from the at least one overhead obstacle.

22. The method of claim 18, wherein the second position includes the at least one drag reducing apparatus on the vehicle being at a height at least proximate to the height of the vehicle.

23. A method for controlling vehicle drag comprising:
providing at least one drag reducing apparatus configured for placement on a vehicle having a height, the at least one drag reducing apparatus for moving between a first position, where the at least one drag reducing apparatus is in an extended position at least partially above the height of the vehicle, and a second position, where the at least one drag reducing apparatus is in a retracted position at a height below the height of the at least one drag reducing apparatus in the first position;

maintaining at least one database for storing a location of at least one overhead obstacle, and at least a first predetermined distance and a second predetermined distance;

determining the location of the vehicle by using a computer programmed with Global Positioning System (GPS) technology;

analyzing the distance between the location of the vehicle and the at the location of the at least one overhead obstacle, and at least one of the first or the second predetermined distances and, moving the at least one drag reducing apparatus between the first and second positions depending on the analyzed distance.

24. The method of claim 23, wherein analyzing the distance between the location of the vehicle and the location of the at least one overhead obstacle, and at least one of the first or second predetermined distances, includes comparing the distance between the location of the vehicle and the location of the at least one overhead obstacle, and at least one of the first or second predetermined distances.

25. The method of claim 24, wherein moving the at least one drag reducing apparatus between the first and second positions depending on the analyzed distance, includes moving the at least one drag reducing apparatus from the first position to the second position when the vehicle is at or within the first predetermined distance.

26. The method of claim 24, wherein moving the at least one drag reducing apparatus between the first and second positions depending on the analyzed distance, includes moving the at least one drag reducing apparatus from the second position to the first position when the vehicle is at or outside of the second predetermined distance.

27. The method of claim 23, wherein the second position includes the at least one drag reducing apparatus being at a height at least proximate to the height of the vehicle.

28. The system of claim 1, wherein the vehicle includes a tractor-trailer.

29. The system of claim 1, wherein the vehicle includes a trailer.

30. The system of claim 1, wherein the vehicle includes a tractor.

31. The system of claim 1, wherein the vehicle includes a self-propelled vehicle.

32. The system of claim 1, wherein the at least one drag reducing apparatus in the second position is at a height proximate to the height of the vehicle.

33. The system of claim 1, wherein the at least one drag reducing apparatus in the second position is at a height at or below the height of the vehicle.

34. The system of claim 7, wherein the at least one drag reducing apparatus, in the retracted position, below the height of the at least one drag reducing apparatus in the first position, is at a height proximate to the height of the vehicle.

35. The system of claim 7, wherein the at least one drag reducing apparatus, in the retracted position, below the height of the at least one drag reducing apparatus in the first position, is at a height at or below the height of the vehicle.

36. The system of claim 7, wherein the vehicle is selected from the group consisting of a trailer, a tractor, a tractor-trailer, and a self propelled vehicle.

37. The system of claim 12, wherein the at least one drag reducing apparatus, in the retracted position, below the height of the at least one drag reducing apparatus in the first position, is at a height proximate to the height of the vehicle.

38. The system of claim 12, wherein the at least one drag reducing apparatus, in the retracted position, below the height of the at least one drag reducing apparatus in the first position, is at a height at or below the height of the vehicle.

39. The system of claim 12, wherein the vehicle is selected from the group consisting of a trailer, a tractor, a tractor-trailer, and a self propelled vehicle.

40. The method of claim 18, wherein the second position includes the at least one drag reducing apparatus on the vehicle being at a height at or below the height of the vehicle.

41. The method of claim 18, wherein the vehicle is selected from the group consisting of a trailer, a tractor, a tractor-trailer, and a self propelled vehicle.

42. The method of claim 23, wherein the second position includes the at least one drag reducing apparatus on the vehicle being at a height at or below the height of the vehicle.

43. The method of claim 23, wherein the vehicle is selected from the group consisting of a trailer, a tractor, a tractor-trailer, and a self propelled vehicle.

* * * * *